(12) United States Patent
Annoura

(10) Patent No.: US 6,681,699 B2
(45) Date of Patent: *Jan. 27, 2004

(54) PLANOGRAPHIC PRINTING PLATE MACHINING DEVICE, PLANOGRAPHIC PRINTING PLATE MACHINING METHOD AND PLANOGRAPHIC PRINTING PLATE

(75) Inventor: Yasuhiro Annoura, Shizuoka-ken (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/176,042

(22) Filed: Jun. 21, 2002

(65) Prior Publication Data

US 2003/0000405 A1 Jan. 2, 2003

Related U.S. Application Data

(62) Division of application No. 09/594,738, filed on Jun. 16, 2000, now Pat. No. 6,431,067.

(30) Foreign Application Priority Data

Jun. 17, 1999 (JP) ............................................ 11-171190

(51) Int. Cl.[7] ................................................. B41N 1/08
(52) U.S. Cl. ...................... 101/463.1; 101/454; 101/458
(58) Field of Search ................................ 101/453, 454, 101/458, 459, 463.1, 401.1; 72/203

(56) References Cited

U.S. PATENT DOCUMENTS

| | | |
|---|---|---|
| 2,053,375 A | 9/1936 | Nicholas |
| 3,724,251 A | 4/1973 | Wegner |
| 3,735,627 A | 5/1973 | Eburn, Jr. |
| 4,353,235 A | 10/1982 | Williamson |
| 4,370,910 A | 2/1983 | Suzuki et al. |
| 4,614,142 A | 9/1986 | Fritz et al. |
| 4,643,093 A | 2/1987 | Goar et al. |
| 5,661,566 A * | 8/1997 | Gerber ........................ 358/304 |
| 5,826,512 A | 10/1998 | Niegawa et al. |
| 6,076,464 A | 6/2000 | Okamura |
| 6,431,067 B1 * | 8/2002 | Annoura ...................... 101/454 |

FOREIGN PATENT DOCUMENTS

| | | | |
|---|---|---|---|
| EP | 0 741 336 A1 | 11/1996 | |
| GB | 2 293 019 A | 3/1996 | |
| JP | 55-91696 | 7/1980 | |
| JP | 5-94055 | 4/1993 | |
| JP | 5-104871 | 4/1993 | |
| JP | 2000108536 A * | 4/2000 | ............ B41N/1/08 |
| WO | WO 94/29043 | 12/1994 | |

OTHER PUBLICATIONS

Japanese Abstract No. 61125718, dated Jun. 13, 1986.

* cited by examiner

Primary Examiner—Daniel J. Colilla
(74) Attorney, Agent, or Firm—Sughrue Mion, PLLC

(57) ABSTRACT

The present invention discloses a planographic printing plate having a notched portion on its surface having a required size, and having smaller burrs at a rear face, and a planographic printing plate cutting device and a planographic printing plate cutting method for forming such a planographic printing plate by cutting. The planographic printing plate cutting device of the present invention includes an upper roller for forming a recessed section at the planographic printing plate. The upper roller, which is formed substantially into a disc shape as a whole, has a pressing portion parallel to a web (the planographic printing plate), and a slope portion that is slanted with respect to the surface of the web at a predetermined inclination. This upper roller presses the web such that a sloped face (recessed section) that is slanted with respect to the surface of the web is formed. Next, a shearing roller shears the web at the sloped face such that a remaining portion of the sloped face forms a notched portion. Because formation of the notched portion and the shearing process are carried out as separate processes by separate members, a notched portion having a required size can be formed at the surface, and burrs at the rear face can be reduced.

18 Claims, 14 Drawing Sheets

F I G. 7
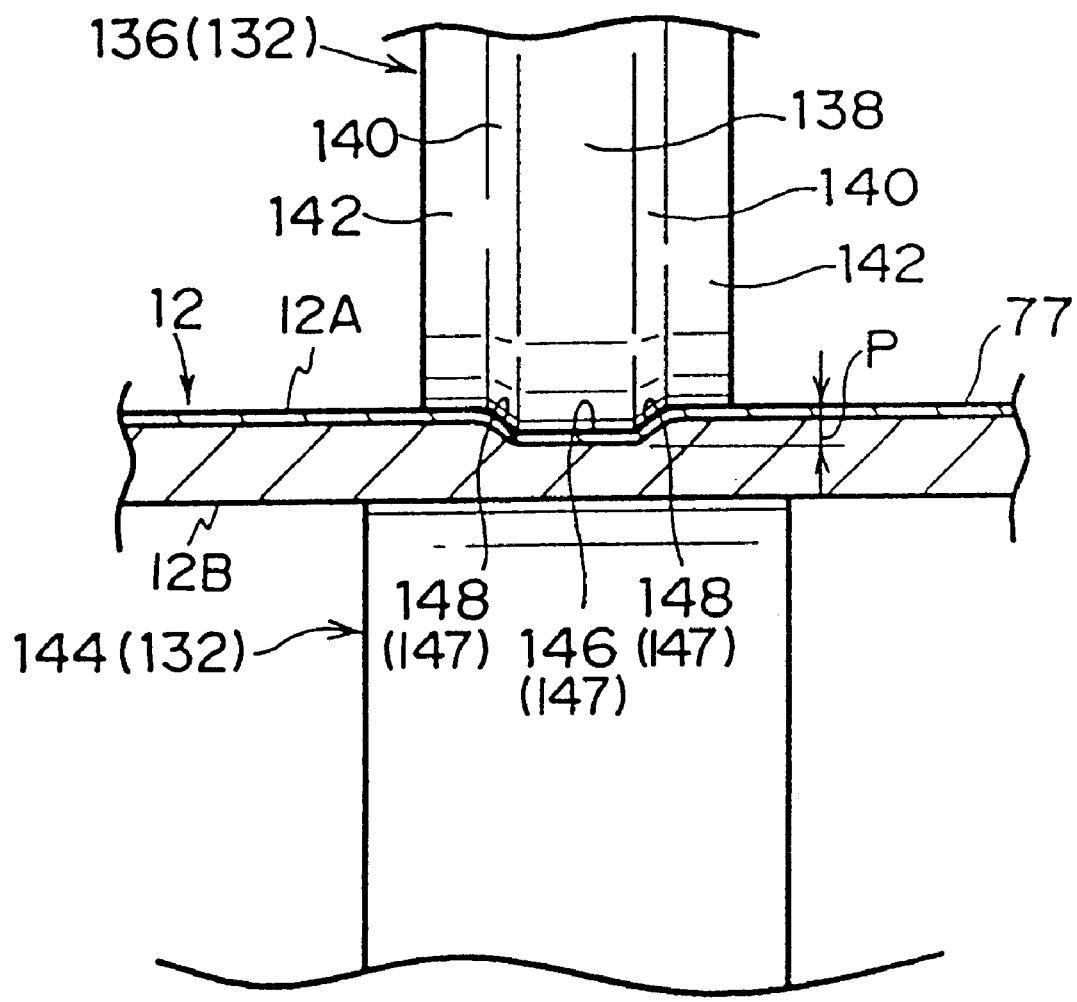

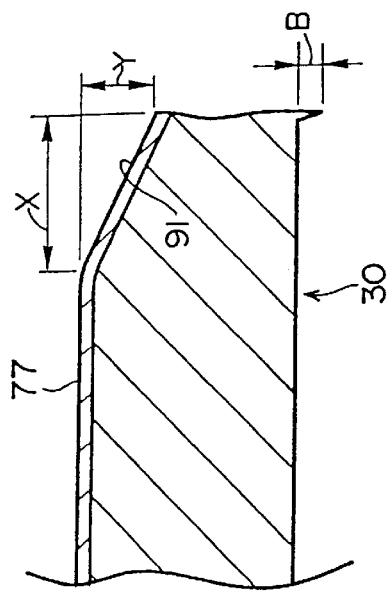

FIG. 14A

| | RECESSED SECTION FORMING PROCESS | | | SHEARING PROCESS | | | | | PS PLATE | | | |
|---|---|---|---|---|---|---|---|---|---|---|---|---|
| | UPPER ROLLER DIAMETER (mm) | LOWER ROLLER DIAMETER (mm) | AMOUNT OF PUSH P (mm) | CLEARANCE C1 (mm) | UPPER BLADE DIAMETER (mm) | LOWER BLADE DIAMETER (mm) | MESH K (mm) | CLEARANCE C2 (mm) | X (μm) | Y (μm) | B (μm) | EDGE STAINING |
| SLITTER CONDITION 1 | | | | | 165 | 155 | 0.2 | 0 | 50 | 10 | 0 | × |
| SLITTER CONDITION 2 | | | | | 160 | 200 | 0.3 | 50 | 150 | 50 | 30 | ○△ |
| SLITTER CONDITION 3 | | | | | 300 | 300 | 0.5 | 100 | 150 | 100 | 50 | △ |
| FIRST EXAMPLE | 165 | 155 | 0.05 | −50 | 165 | 155 | 0.2 | 0 | 100 | 50 | 0 | ○ |
| SECOND EXAMPLE | 165 | 200 | 0.1 | 0 | 165 | 200 | 0.3 | 10 | 200 | 70 | 10 | ○ |
| THIRD EXAMPLE | 300 | 300 | 0.1 | | 300 | 300 | 0.5 | 5 | 250 | 100 | 5 | ○ |
| FOURTH EXAMPLE | 150 | 200 | 0.1 | | 150 | 200 | 0.3 | 5 | 100 | 100 | 0 | ○ |
| FIFTH EXAMPLE | 200 | | | −50 | 165 | 200 | 0.2 | 0 | 150 | 40 | 20 | ○△ |
| | PRIOR ART | | | | PRESENT INVENTION | | | | | | | |

FIG. 14B

PLANOGRAPHIC PRINTING PLATE MACHINING DEVICE, PLANOGRAPHIC PRINTING PLATE MACHINING METHOD AND PLANOGRAPHIC PRINTING PLATE

This is a divisional of application Ser. No. 09/594,738 filed Jun. 16, 2000, now U.S. Pat. No. 6,431,067 the disclosure of which is incorporated herein by reference.

BACKGROUND OF THE INVENTION

1. Field of the Invention

The present invention relates to a planographic printing plate machining device, a planographic printing plate machining method and a planographic printing plate, and more particularly, concerns a planographic printing plate capable of improving the appearance of a surface of printed paper, and a planographic printing plate machining device and planographic printing plate machining method for providing such a planographic printing plate through a machining process (in particular, machining at edge portions).

2. Description of the Related Art

In general, a photosensitive planographic printing plate (hereinafter referred to as a "PS plate" when appropriate) is manufactured through processes in which a support member, such as an aluminum plate in a sheet shape or a coil shape, is subjected to one or an appropriate combination of surface processes such as graining, anode oxidation, silicate processing and other chemical processes and the like, further subjected to coating of a photosensitive liquid and a drying process, and then cut to a desired size. This PS plate is further subjected to plate-forming processes such as exposure, development, gumming and the like, set in a printing press, and coated with ink. Thus, characters, images, etc. are printed on a surface of paper.

Printing using such a PS plate may be printing on printing paper that has a size smaller than the size of the PS plate using a general commercial printing press, and may be printing on printing paper that has a size larger than the size of the PS plate, such as, when printing newspapers and the like. In the latter case, because the entire surface of the PS plate is used as a printing surface, ink adhering to cut edges (peripheral portions) of the PS plate may be printed on the printing paper, resulting in stains and consequently reducing commercial value of printed matter.

With respect to methods for preventing such stains adhering to the surface of printing paper due to unnecessary ink on the PS plate, for example, Japanese Patent Application Publication (JP-B) No. 57-46754 discloses a method in which corners of the edges of an aluminum support member are trimmed with a file or a knife, and JP-B No. 62-61946 discloses a method in which insensitive oil is applied to cut edge surfaces.

Further, as disclosed in Japanese Patent Application Laid-Open (JP-A) No. 62-19315, burrs caused during cutting are one of the causes of such stains and thus there are methods for preventing burrs from occurring at the printing surface side. Furthermore, JP-A No. 7-32758 has proposed shaping in which the cut edges are bent toward a side opposite the printing surface and consequent improvements can be seen.

However, in the method of trimming corners of edge portions of the support member with a file or a knife, PS plates have to be taken out one by one to be trimmed. Therefore, this method is not appropriate for use in bulk processing. When there are defects, such as burrs and scratches, that cause adhesion of ink is caught at trimmed portions, and may eventually cause stains on the surface of printing paper. Further, in the method of applying an insensitive oil to the cut edge surfaces, PS plates may stick to each other, causing difficulty in handling, and development failures may occur.

Moreover, depending on printing conditions, stains may still appear if burrs are simply not caused to occur at the printing paper surface side during cutting. Furthermore, a shape in which the cut edge portions are bent downward (toward the side opposite the printing surface) tends to improve staining but may be a cause of transport failures, such as snagging problems, during transportation at a printing plate forming device that performs exposure and development.

In order to solve the above-mentioned problems, a method has been proposed in which, when a PS plate is sheared with a slitter, cutter, etc., a cutoff is effectively formed at each edge corner portion of a surface treatment layer, at the same time as shearing, by using so-called shearing drops. This method has been respectively disclosed in: JP-A No. 5-104871, JP-A No. 8-11451, JP-A No. 9-53465, JP-A No. 9-323486, JP-A No. 10-35130 and JP-A No. 10-100566 and the like.

However, if cutoffs that are effective for preventing stains on the printing paper surface are formed by shear processing using slitters, cutters and the like, large burrs may occur at a rear surface (a surface opposite the surface at which the surface treatment layer is formed). When these burrs protrude from the rear surface, problems such as, the PS plate meandering while being transported in an exposing device or the burrs falling off and becoming garbage occur. Moreover, at the time of shearing, large cracks may occur at the front surface (the surface at which the surface treatment layer is formed), which affects the printed matter.

In order to solve the above-mentioned problems, a method has been proposed in which such a machining operation is carried out in a coil manufacturing process. For example, cutoffs are formed in a step prior to formation of the surface treatment layer at the support member. However, in this manufacturing method, processing must be done after setting the coil width for each size of the PS plates. In particular, if the PS plates have a large number of sizes, it is difficult to set the coil width for each size. Moreover, pluralities of PS plates may be formed from an elongated web in a width direction thereof but the above-described method is capable of producing only one PS plate in the width direction of the web, resulting in a reduction in manufacturing efficiency.

SUMMARY OF THE INVENTION

The present invention has been devised to solve the above-described problems and its object is to provide a planographic printing plate which has smaller burrs generated at a rear face and has a cutoff portion having a sufficient size at a surface, and a planographic printing plate machining device and a planographic printing plate machining method for forming such a planographic printing plate by cutting.

In a first aspect of the present invention, the planographic printing plate machining device of the present invention is provided with a pressing member which presses and indents a planographic printing plate from the printing side surface, thereby forming a recessed section that has a sloped face which continues from the printing side surface; and a cutting member for cutting the planographic printing plate.

When a planographic printing plate is machined using this planographic printing plate machining device, first, the planographic printing plate is pressed by the pressing member from the surface, with the result that a recessed section having a sloped face which continues from the surface and slants with respect to the surface is formed. Then, the cutting member cuts the planographic printing plate along this recessed section. Therefore, one portion or the whole of the sloped face formed by the pressing member is allowed to remain at the planographic printing plate after cutting, and this remaining sloped face effectively forms a cutoff portion.

Hence, since formation of the cutoff portion and cutting of the planographic printing plate are carried out using separate respective members, it is not necessary to generate a shearing drop to form a cutoff portion at a time of cutting. Therefore, the planographic printing plate can be cut under conditions that make smaller shearing drops at the time of cutting smaller, thereby making reduction of burrs (or more preferably, elimination of burrs) possible. Moreover, because the pressing process is positively done by the pressing member, a cutoff portion having a required size can be formed easily. In particular, even in the case of a planographic printing plate covered with a surface treatment layer containing, for example, an anode oxidation layer, it is possible to form a cutoff portion having a required size.

In the present invention, "cutting" refers to cutting process that passes through a planographic printing plate in a plate thickness direction at a predetermined position. For example, this includes any cutting, such as cutting the web of an elongated planographic printing plate along a width direction, or for cutting such an elongated web in a length direction (so-called shearing) and cutting in a diagonal direction.

Moreover, the position of cutting of the planographic printing plate by the cutting device may be any position within the recessed portion, and is not limited to the sloped face of the recessed portion. For example, in a case wherein a flat face which is parallel to the surface of the planographic printing plate is formed continuously with the sloped face (therefore, the flat face also forms the recessed portion), the planographic printing plate may be cut at this flat face.

In a second aspect of the present invention, the pressing member is provided with a pressing portion extending in a direction substantially parallel with the printing side surface of a planographic printing plate, for pressing the planographic printing plate from the printing side surface; and a sloped portion that is slanted with respect to the printing side surface of the planographic printing plate so as to form the sloped face when the pressing portion presses the planographic printing plate.

In this aspect, because the pressing portion presses the planographic printing plate from a surface side, the planographic printing plate is positively indented to form the recessed portion. Moreover, as the pressing portion presses the planographic printing plate, the sloped portion forms the sloped face at the planographic printing plate. Because the shape of the sloped face (i.e. cutoff) is determined by the sloped portion, a sloped face having a desired shape can be formed by modifying the shape of the sloped portion.

In a third aspect of the present invention, the pressing member is provided with the pressing portion includes a contact section that contacts the printing surface side of the planographic printing plate, when the pressing portion presses the planographic printing plate and the sloped portion forms the sloped face.

In this aspect, when the pressing member presses the planographic printing plate, the contact portion is allowed to contact the surface of the planographic printing plate so that it is possible to prevent lifting of the planographic printing plate, positional offset, etc.

In a fourth aspect of the present invention, a supporting member which supports the planographic printing plate is further provided, the recessed section being formed by sandwiching the planographic printing plate between the support member and the pressing member, and the cutting member includes a cutting blade which cuts the planographic printing plate between the cutting blade and said supporting member.

In other words, the pressing member and the cutting member have the supporting member as a component in common. Consequently, the cutting member can be positioned and made to cut with high precision with respect to the recessed section formed by the pressing member. Moreover, since the supporting member is used in common, the number of constituent parts forming the planographic printing plate machining device is reduced.

In a fifth aspect of the present invention, the planographic printing plate machining device is provided with a shearing press blade formed to integrally include: a cutting blade section that is capable of cutting the planographic printing plate, thereby forming a cut edge portion; and a recessed section forming section which presses the cut edge portion so as to form a recessed section in the planographic printing plate.

In this aspect, the cutting blade section cuts the planographic printing plate, and the recessed section forming section presses the cut edge portion of the planographic printing plate, thereby obtaining a planographic printing plate in which a desired cutoff is formed. Here, the cutting blade section and the recessed section forming section function as the cutting member and the pressing member in the first feature. In other words, in accordance with the present aspect, the shearing member and the pressing member are formed into one shearing press blade. Thus, it is possible to improve machining precision at a time of machining, and also to reduce the number of parts required for machining.

In a sixth aspect of the present invention, the planographic printing plate machining device is further provided with an expansion permission section, which permits expansion of the planographic printing plate caused by pressing.

In this aspect, the planographic printing plate is partially moved by pressing force from the pressing member, and a portion of the planographic printing plate expands and enters the expansion permission section. Hence, expansion due to the movement of the planographic printing plate at the time of pressing is allowed by the expansion permission section. Thus, the surface side of the planographic printing plate is positively pressed and it is possible to form the sloped face even if the pressing force from the pressing member is small.

In a seventh aspect of the present invention, the cutting member cuts the planographic printing plate along an area within the recessed section of the planographic printing plate.

When cutting is done at a plurality of positions (areas) with respect to one recessed section, a portion between the cutting positions becomes chips. However, by cutting the planographic printing plate at one position with respect to one recessed section, such chips are not generated, and the planographic printing plate can be machined without wasting materials.

In an eighth aspect of the present invention, the planographic printing plate machining method includes a recessed section forming process for pressing and indenting a planographic printing plate from the surface on the printing side to form a recessed section which continues from this surface, and has a sloped face slanting with respect to the surface, and a cutting process for cutting the planographic printing plate at a predetermined cutting position.

In this planographic printing plate machining method, either of the recessed section forming process and the cutting process may be carried out first.

In a case wherein the recessed portion forming process is carried out first, thereof in the recessed section forming process, the planographic printing plate is pressed by the pressing member from the surface so that a recessed section which continues from the surface and has a sloped face slanting with respect to the surface, is formed at the planographic printing plate. Next, in the cutting process, the planographic printing plate is cut at the recessed section. As a result, one portion or the whole of the sloped face formed in the recessed section forming process remains at the planographic printing plate after the cutting process, and this remaining sloped face effectively forms a cutoff.

In contrast, in a case wherein the cutting process is carried out first, the planographic printing plate is first cut to a desired size at a predetermined cutting position. Next, the recessed section is formed by the recessed section forming process at a cut edge portion of the cut planographic printing plate. As a result, a sloped face; i.e. a cutoff, is formed at the edge portion of the planographic printing plate that is finally obtained.

Additionally, in the case wherein the cutting process is carried out first, a planographic printing plate machining device in accordance with, for example, the fifth aspect may be used. In other words, immediately after the cutting blade portion of the cutting press blade cuts the planographic printing plate in the cutting process, the recessed section can be formed with the recessed section forming section of the shearing press blade as the recessed portion forming process.

In this aspect, whichever of the recessed section forming process and the cutting process is carried out first, the formation of the cutoff and the cutting of the planographic printing plate are carried out in respectively separate processes. Thus, the cutting process is less susceptible to shearing drops at the time of forming the cutoff. In other words, it is possible to cut the planographic printing plate under conditions that can reduce shearing drops, and consequently to reduce burrs (and more preferably, to eliminate burrs). Moreover, because the sloped face is formed by the recessed portion forming process independently from the cutting process, it is possible to easily form a cutoff portion having a required size. In particular, even in the case of a planographic printing plate covered with a surface treatment layer containing, for example, an anode oxidation layer, it is possible to form a cutoff portion having a required size.

In a ninth aspect of the present invention, the planographic printing plate is provided with a printing surface and a recessed section having a sloped face that continues from said printing surface, and a sheared surface terminating said recessed section.

In the case of a planographic printing plate in accordance with this aspect, a desired shape is cut from the recessed section. Thus, of the sloped face of the recessed section, the portion inside the cut section remains to form the cutoff portion. Moreover, the planographic printing plate with the desired shape cut at the recessed section, can be cut under conditions that reduce shearing drops at the time of cutting. Consequently, it is possible to minimize burrs (and more preferably, to eliminate burrs). Because the formation of the sloped face and the cutting process are carried out separately, the planographic printing plate is formed with a cutoff portion having a required size.

Additionally, a planographic printing plate based on the ninth aspect can be machined and manufactured by a planographic printing plate machining method based on the eighth aspect. In the case wherein the recessed section forming process is carried out first, the requirement of cutting at the recessed section can be satisfied by taking into consideration the cutting position at the time of the cutting process. Moreover, in the case wherein the shearing process is carried out first, the requirement of cutting at the recessed portion is effectively satisfied by forming the recessed section at the cut edge portion in the recessed section forming process.

Furthermore, in the above aspects, the condition that the sloped face "continues" is effectively satisfied as long as ink does not adhere at a boundary portion between the sloped face (i.e. the cutoff) and the surface of the planographic printing plate and does not cause any line-shaped stains (so-called edge stains) to be printed on a surface of printing paper. Therefore, in this regard, even in a case when, for example, steps, grooves, etc. are present between the surface of the planographic printing plate and the sloped face, if those steps and grooves are so small that edge stains due to those steps and grooves are not printed on the surface of printing paper, the condition of the present invention that the sloped face "continues" is effectively satisfied.

BRIEF DESCRIPTION OF THE DRAWINGS

FIG. 7 is a front view that shows a pressing roller that forms a section of a third embodiment of the present invention.

FIG. 12A is a cross-sectional view of a web at which a recessed section having a flat face is formed; FIG. 12B is a cross-sectional view of a planographic printing plate obtained by cutting the web shown in FIG. 12A; FIG. 12C is a cross-sectional view of a web in which a recessed section without a flat face is formed; and FIG. 12D is a cross-sectional view of a planographic printing plate obtained by cutting the web shown in FIG. 12C.

FIG. 14A is an explanatory enlarged drawing that shows a shape of a PS plate obtained by the shearing section of the present invention.

FIG. 14B is a table that shows relationships between the shapes of PS plates and edge stains for a conventional shearing section and shearing sections of the present invention.

DESCRIPTION OF THE PREFERRED EMBODIMENTS

Figure 1:
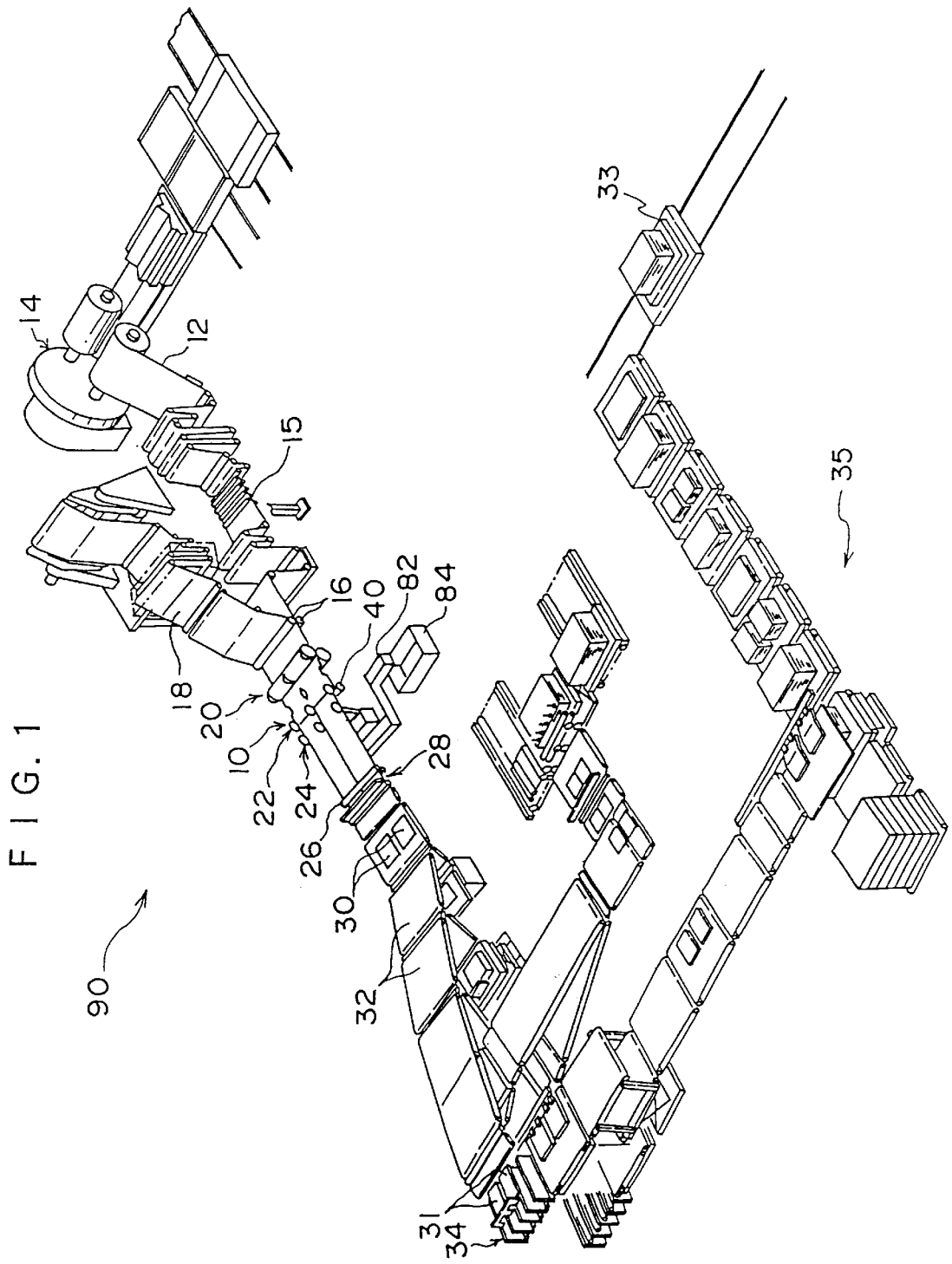
FIG. 1 is a perspective view that shows a machining line for a PS plate having a shearing section of a first embodiment of the present invention.

FIG. 1 shows a machining line 90 for a PS plate having a shearing section 10 that is a planographic printing plate machining device of a first embodiment of the present invention.

At an upstream side of this machining line 90 (upper-right side of FIG. 1), a feeding machine 14 for successively unwinding a web that has been preliminarily wound up into a roll shape is disposed. The elongated web 12, fed from the feeding machine 14, is subjected to a curl-removing treatment at a leveler 15, reaches a feed roller 16 at which joining paper 18 is affixed and made to closely contact by a static charge, and sent to a notcher 20.

The notcher 20 provides a cutout section at the web 12 so that upper rollers 36, 38 and 40 and lower rollers 42, 44 and 46 of a pressing roller 22 forming the shearing section 10, and upper blades 48, 50 and 52 and lower blades 54, 56 and 58 (see FIG. 2 and FIG. 3) of a shearing roller 24 also forming the shearing section 10 are allowed to shift in the width direction of the web 12 at the position of this cutout. Hence, it is possible to change a trimming width of the web 12, while the web 12 and the joining paper 18 are being continuously sheared together. Hereinafter, "width direction", when referred to simply thus, represents the width direction of the web 12; and "inside" and "outside" respectively represent an inside and outside in the width direction of the web 12.

A feeding length of the web 12, which has been set to a predetermined trimming width in this manner, is subjected to detection by a length-measuring device 26 and cut by a travelling cutter 28 with a fixed timing. Thus, a PS plate 30 having a set size is manufactured.

Next, the PS plate 30 is transported to an accumulation section 34 by a conveyor belt 32, and a predetermined number are stacked to form an accumulated bundle 31. Here, at the accumulation section 34, protection sheets made of cardboard, etc. (generally, referred to as "contact board") may be disposed above and below the accumulated bundle 31 or at a side thereof.

The accumulated bundles 31 are stacked on a pallet 33 via a transport section 35, and then sent to a storage place such as a rack housing, or to a packing process to be packed with packing materials (such as tape, packaging agents, wrapping materials, etc.). Moreover, they can be stacked on skids (plane skids, longitudinal skids, etc.) for use in an automatic printing plate forming machine. In addition, in a case of stacking on these skids and packaging, an accumulating device for accumulating the accumulated bundles 31 on the skids may be provided at the machining line 90, and the PS plates 30 may be directly accumulated at skids at the machining line 90.

In this manner, the PS plates 30 may be packaged and shipped but, depending on packaging states, the joining paper 18 and other packing materials may be omitted.

Figure 2:
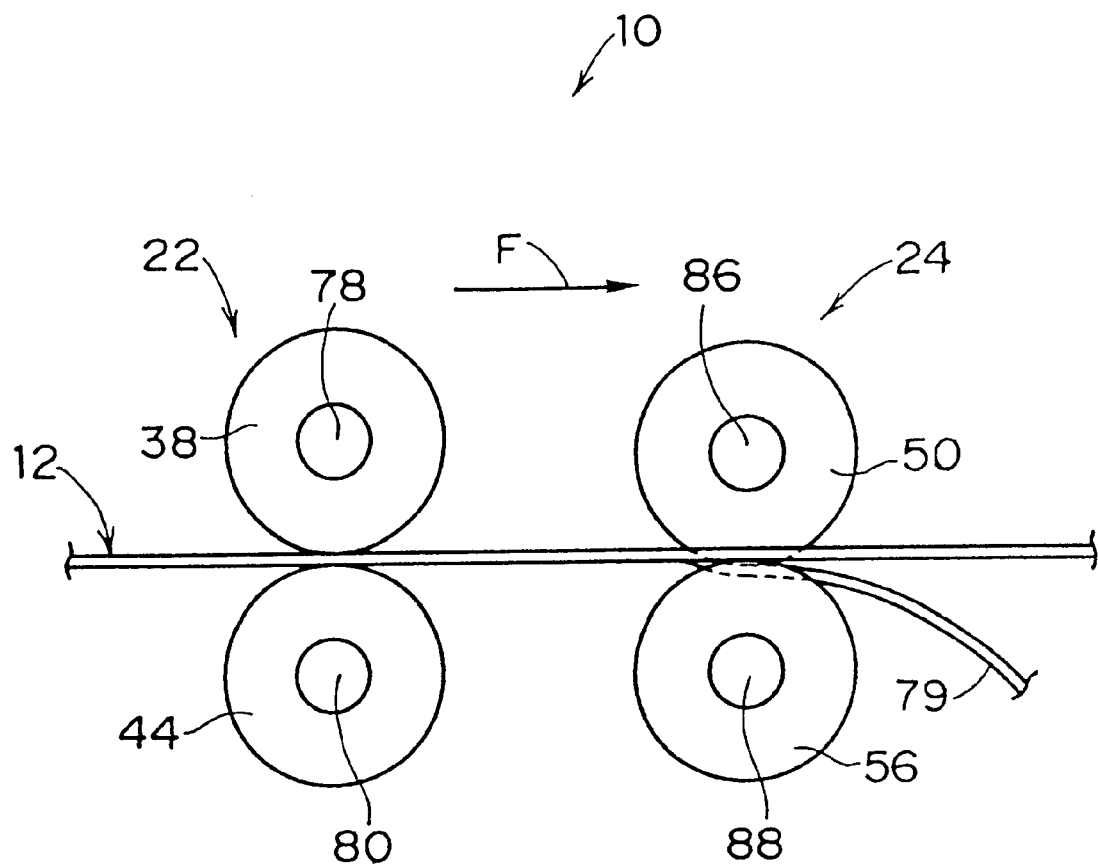
FIG. 2 is a side view that shows the shearing section of the first embodiment of the present invention.
Figure 3:
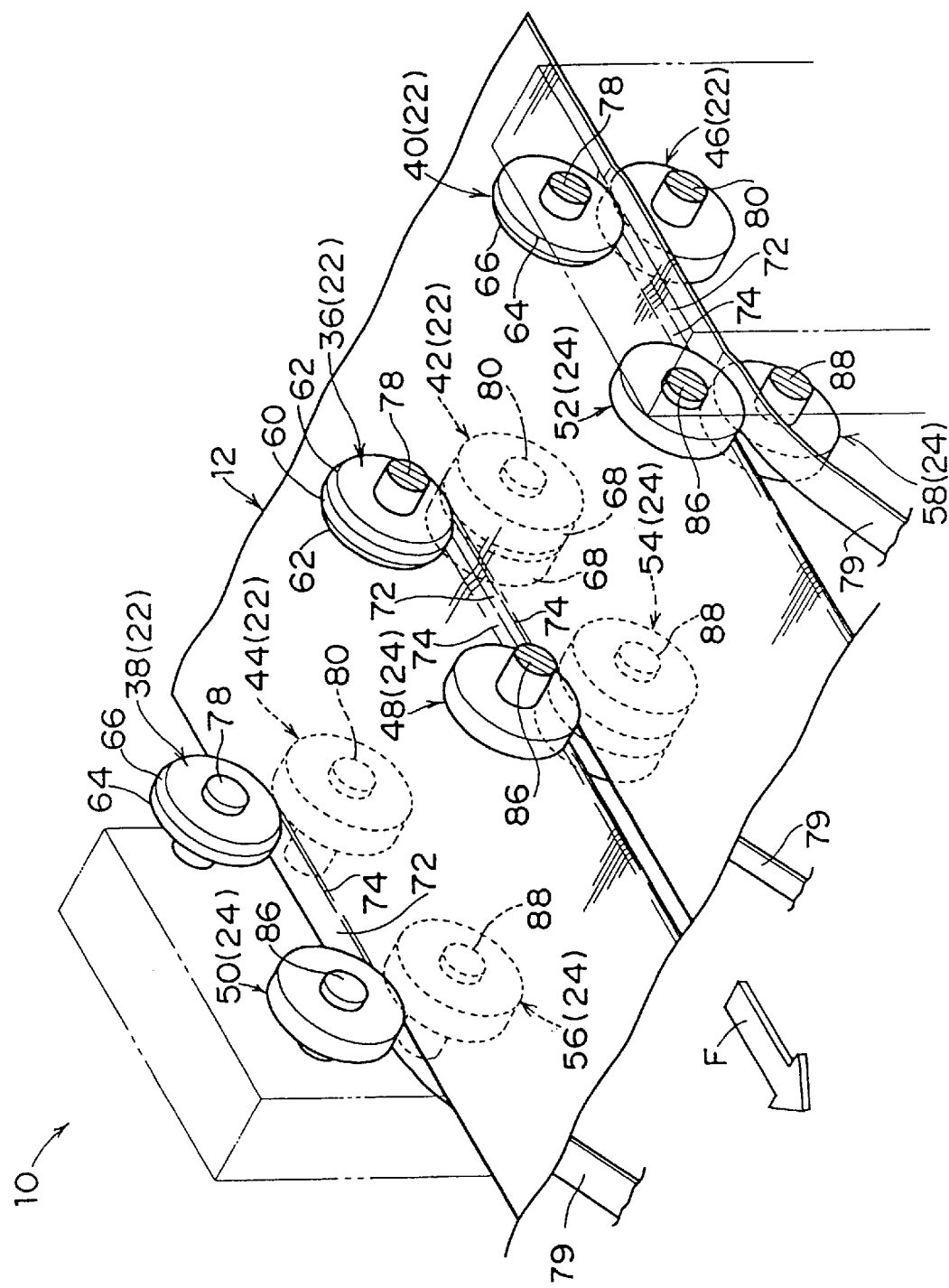
FIG. 3 is a perspective view that shows the shearing section of the first embodiment of the present invention.

As shown in FIGS. 2 and 3, the shearing section 10 is formed by pressing rollers 22 provided at an upstream side of the transporting direction of the web 12 (the direction of arrow F), and shearing rollers 24 placed at a downstream side from the pressing rollers 22.

The pressing rollers 22 are formed by upper rollers 36, 38 and 40, which are disposed at the surface 12A side of the web 12 at predetermined positions in the width direction of the web 12 and lower rollers 42, 44 and 46, which are disposed at the lower side of the web 12 so as to correspond to the upper rollers 36, 38 and 40 (Herein, the term "surface" usually refers to the obverse of a web of printing plate; i.e., the face at which a recessed portion is formed and which is shown toward the top of the drawings).

Here, the numbers of the upper rollers and lower rollers are determined by how many PS plates 30 are to be formed in the width direction of the web 12. The present embodiment exemplifies a case in which two PS plates 30 are formed as a row in the width direction, and the following rollers are shown: the upper roller 36 and the lower roller 42 substantially at the center of the web 12 in the width direction and the upper rollers 38, 40 and the lower rollers 44, 46 at end portions in the width direction. In general, in a case wherein N PS plates 30 are formed in the width direction of the web 12, the number of upper rollers and lower roller units is (N+1). However, in a case wherein no shearing processes are required in the vicinity of end portions in the width direction of the web 12, for example, because side portions (end portions in the width direction) of the web 12 already have sloped faces 74 (see FIG. 14A), the number of the upper roller and lower roller units is (N−1). Also, in FIG. 4, for convenience of explanation, of the upper rollers 38 and 40 and the lower rollers 44 and 46 at both sides, only the upper roller 38 and the lower roller 44 at one side are shown. However, the upper roller 40 and the lower roller 46 are symmetrically disposed at the left side of FIG. 4.

Figure 4:
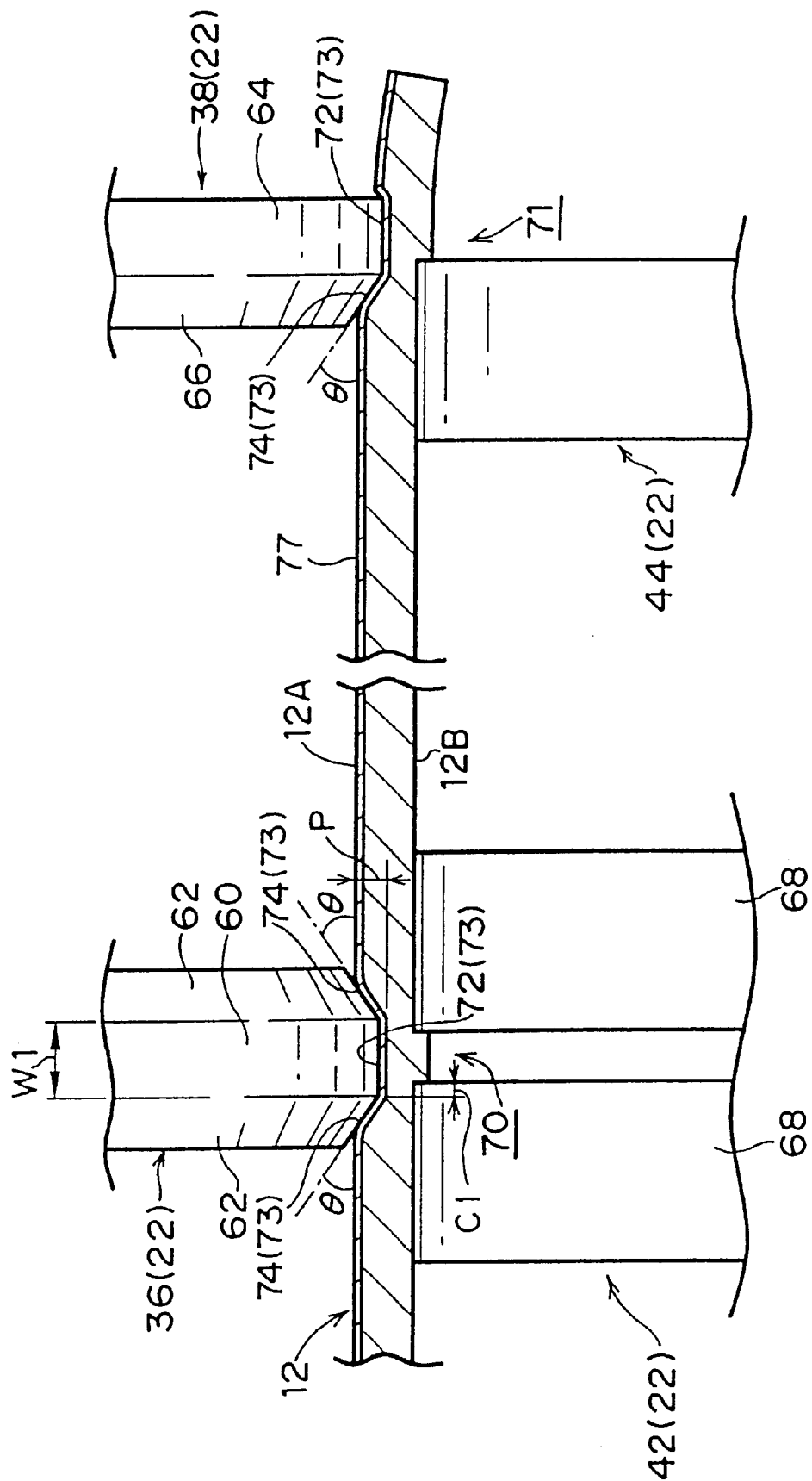
FIG. 4 is a front view that shows pressing rollers that form the shearing section of the first embodiment of the present invention.
Figure 10:
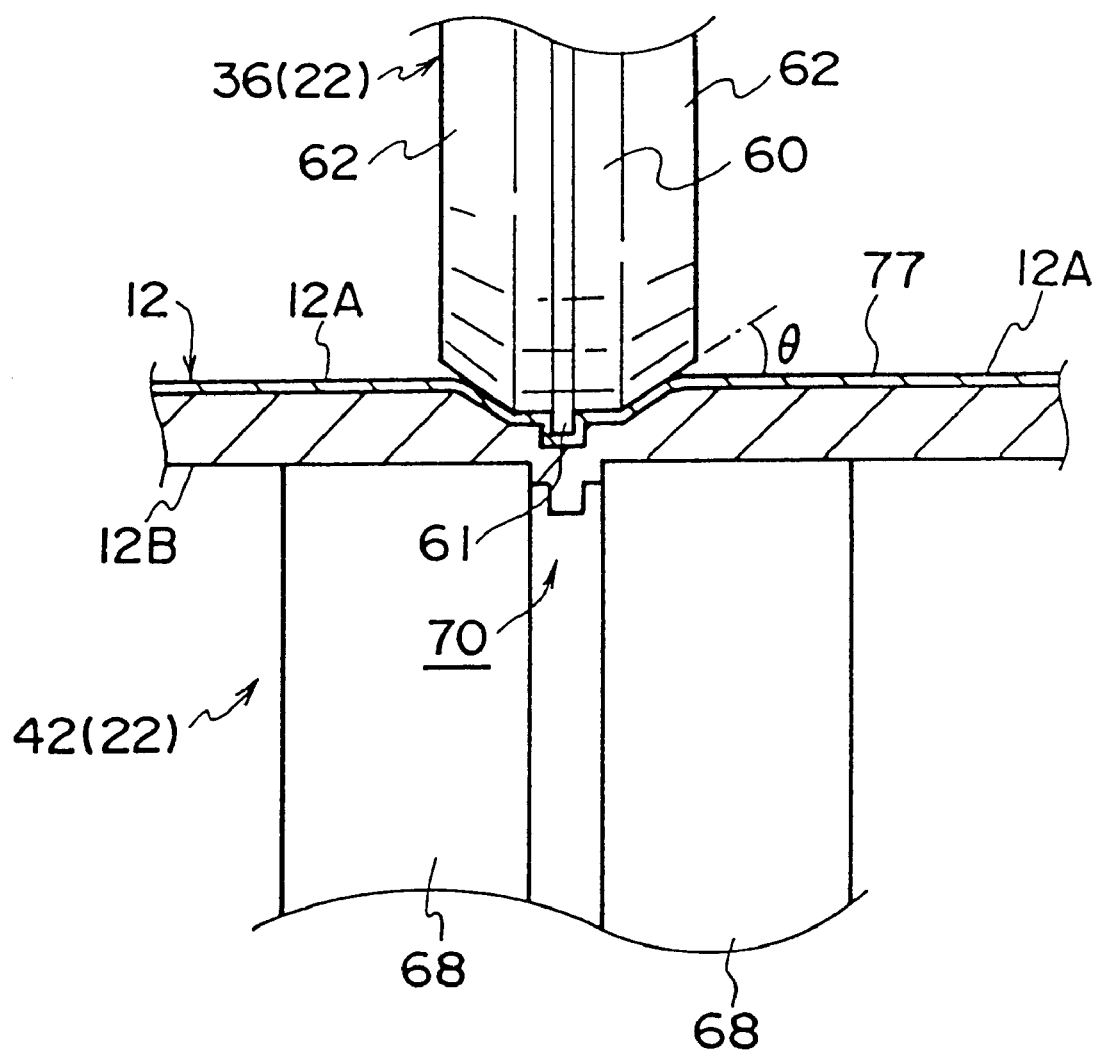
FIG. 10 is a front view that shows an example of a pressing member of the first embodiment of the present invention different from that shown in FIG. 4.

As also shown in FIG. 4, the upper roller 36 at the center is substantially disc shaped as a whole, and a pressing section 60, which has a fixed radius and a width (length in the axial direction) W1, is formed at the center in the axial direction of the upper roller 36. An angle made by a peripheral face of the pressing section 60 and the surface 12A of the web 12 can be selected as appropriate but the peripheral face and the surface 12A are preferably parallel with each other. Moreover, as shown in FIG. 10, the pressing section 60 may be shaped to provide a plurality of steps in order to deform a material (aluminum) more easily with a protruding portion 61, which is formed protruding further outward in a radial direction at the center of the pressing section 60, and the like.

From each of both axial direction sides of the pressing section 60, a truncated cone shaped slope portion 62 whose radius decreases distally is formed. A peripheral face of the slope portion 62 is formed into a predetermined shape such that the lowest portion thereof has a slope with a fixed inclination θ with respect to the surface 12A of the web 12.

The upper rollers 38 and 40 on end portions may have the same shape as the upper roller 36 in the center, or may have a different shape, formed by a pressing section 64 and a slope portion 66 having a truncated cone shape whose radius decreases toward the inner side from the pressing section 64. In the same manner as the pressing section 60 of the upper roller 36, the pressing section 64 is usually parallel with the surface 12A of the web 12, and one portion is partially reaches into the web 12. Moreover, in the same manner as the slope portion 62, the peripheral face of the slope portion 66 is formed into a shape such that the lowest portion thereof has a slope with a fixed inclination θ with respect to the surface 12A of the web 12.

As shown in FIG. 3, the upper rollers 36, 38 and 40 are respectively fixed to a shaft 78, and rotate in the same direction at the same speed as the web 12.

The lower roller 42, provided in correspondence with the upper roller 36 at the center, is formed by two receive rollers 68 that are disposed with a fixed spacing. The gap between these receive rollers 68 can be selected appropriately to the shape of the PS plates 30 that are finally produced. Moreover, this gap forms an escape section or expansion permission section 70 which allows movement of the material of the web 12 and receives a portion of the material (aluminum) that is pressed and deformed by the pressing roller 22.

The lower rollers 44 and 46, provided in correspondence with the end portion upper rollers 38 and 40, are offset inward from the upper rollers 38 and 40. Hence, an escape section 71, which allows movement of the material of the web 12 and receives a portion of the material that is pressed and deformed by the upper rollers 38 and 40, is formed outside each of the lower rollers 44 and 46.

All of the lower rollers 42, 44 and 46 have substantially the same diameter, and the web 12 is transported on these lower rollers 42, 44 and 46 with a photosensitive layer 77 facing up (see FIGS. 3 and 4). The web 12 is pressed by the pressing rollers 22 while being transported such that at the surface 12A of the web 12, the sloped face 74, which continues from the surface 12A and has a slope with a fixed inclination θ with respect to the surface 12A, and flat faces 72 corresponding to the pressing sections 60 and 64 are formed. Further, the lower rollers 42, 44 and 46 are attached to a shaft 80, and allowed to rotate in an opposite direction to the direction of rotation of the upper rollers 36, 38 and 40 at the same speed as the web 12.

Here, each of the shafts 78 and 80 may be formed as one shaft, or may be formed divided in the width direction (the length direction of the shafts 78 and 80) for the respective upper rollers 36, 38 and 40 and lower rollers 42, 44 and 46. In general, divided shafts 78 and 80 make setting conditions of the upper rollers 36, 38 and 40 and the lower rollers 42, 44 and 46 easier.

The shearing rollers 24 are provided with upper blades 48, 50 and 52 corresponding to the upper rollers 36, 38 and 40 and lower blades 54, 56 and 58 corresponding to the lower rollers 42, 44 and 46, of the pressing rollers 22.

As shown in detail in FIG. 5, the upper blade 48 at the center is set such that the lowest portion of a peripheral face thereof is positioned below a rear face 12B of the web 12. Moreover, a width (length in the axial direction) of the upper blade 48 is set to a predetermined width such that, with respect to the sloped faces 74 formed at the surface 12A of the web 12, each of both ends in the axial direction of the upper blade 48 is positioned substantially in the center in the width direction of a sloped face 74.

In the same manner as the upper blade 48 at the center, each of the upper blades 50 and 52 at the end portions is set such that the lowest portion of a peripheral face thereof is positioned below the rear face 12B of the web 12. Moreover, the upper blades 50 and 52 are set at predetermined positions with predetermined widths such that, with respect to the sloped faces 74 formed at the surface 12A of the web 12, an inside end face of each of the upper blades 50 and 52 is positioned substantially in the center in the width direction of a sloped face 74.

Also, as shown in FIG. 3, the upper blades 48, 50 and 52 are attached to a shaft 86, and allowed to rotate in the same direction at the same speed as the web 12.

Figure 5:
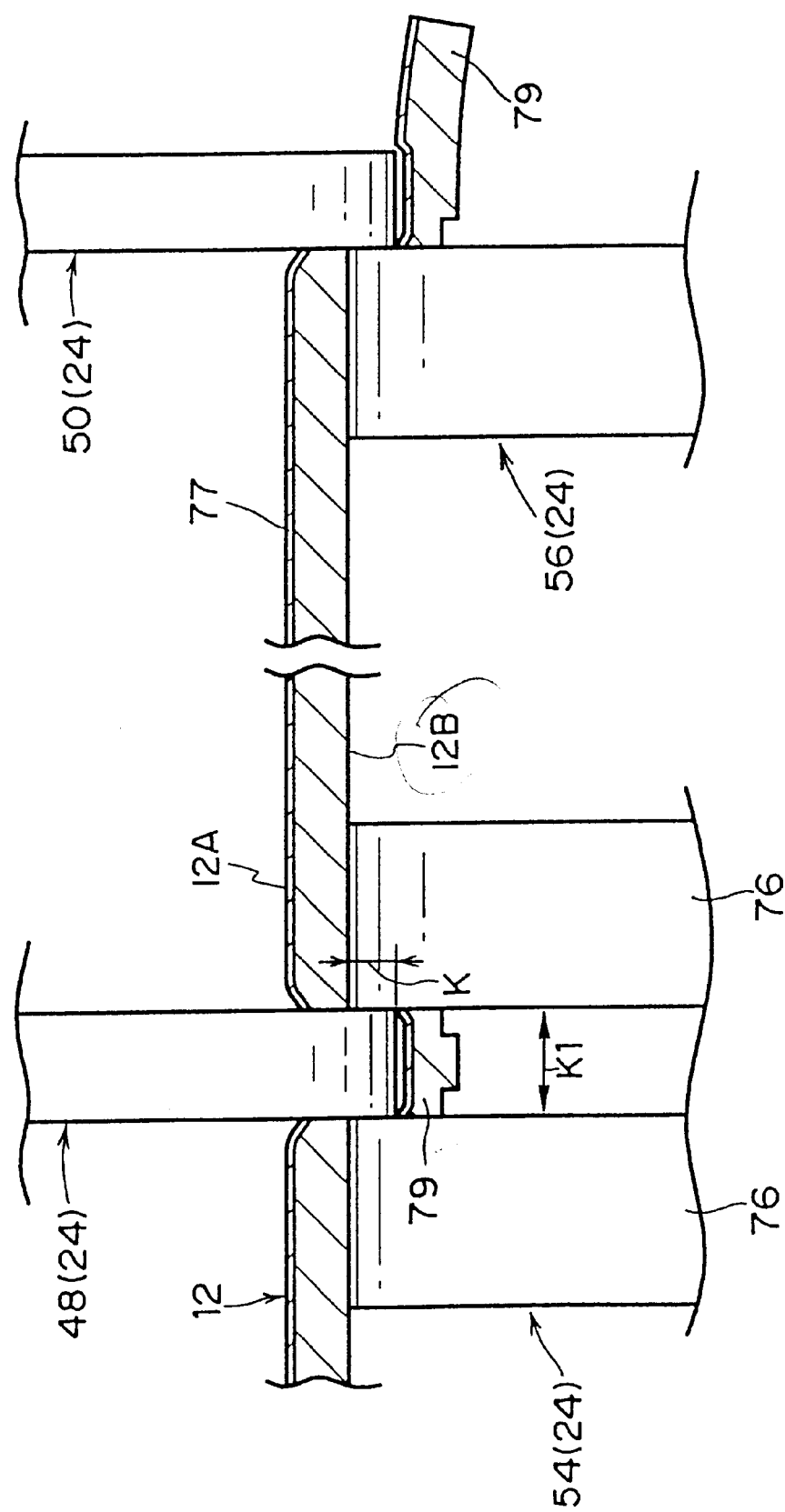
FIG. 5 is a front view that shows shearing rollers that form the shearing section of the first embodiment of the present invention.

As shown in FIG. 5, the lower blade 54 corresponding to the upper blade 48 at the center is formed by two receiving rollers 76 disposed with a fixed gap K1 therebetween. The gap K1 is set to be virtually the same as or slightly wider than a width W1 of the upper blade 48 such that the shearing mechanism formed by the upper blade 48 and the lower blade 54 generates fewer burrs at the web 12 (or more preferably, generates no burrs).

Also, shearing mechanisms formed by the lower blades 56 and 58 and the upper blades 50 and 52 at the end portion have inside end faces of the upper blades 50 and 52 positioned at the same respective planes, or offset slightly outside, as outside end faces of the lower blades 56 and 58 such that those mechanisms generate from burrs at the web 12 (or more preferably, generate no burrs).

In the same manner as the lower rollers 42, 44 and 46, all of the lower blades 54, 56 and 58 have substantially the same diameter, and the web 12 is transported on these lower blades 54, 56 and 58 with the photosensitive layer 77 facing up (see FIGS. 3 and 4). Further, the lower blades 54, 56 and 58 are attached to a shaft 88, and allowed to rotate in an opposite direction to the direction of rotation of the upper blades 48, 50 and 52 at the same speed as the web 12.

Here, each of the shafts 86 and 88 may be formed as one shaft, or may be formed divided in the width direction (the length direction of the shafts 86 and 88) for the respective upper blades 48, 50 and 52 and the lower blades 54, 56 and 58. In general, divided shafts 86 and 88 make setting conditions of the upper blades 48, 50 and 52 and the lower blades 54, 56 and 58 easier.

Next, an explanation will be given of a method for shearing (cutting) the web 12 using the shearing section 10 of the first embodiment having the above-mentioned structure.

As shown in FIG. 1, a web 12, transported at the machining line 90, is transported while being supported by the lower rollers 42, 44 and 46 forming the pressing rollers 22. At this time, the upper rollers 36, 38 and 40 rotate and press the web 12 from the upper side. Thus, the web 12 is partially deformed to form, at the surface 12A of the web 12, a recessed section 73 having a flat face 72 corresponding to the pressing section 60 and a sloped face 74 corresponding to the slope portion 62 (recessed section forming process).

Here, the support member (aluminum) of the deformed web 12 enters the escape sections 70 and 71 formed by the lower rollers 42, 44 and 46. Thus, deformation movements of the support member of the web 12 are allowed and, even if a pressing force (machining force) of the upper rollers 36, 38 and 40 is small, the web 12 can be reliably deformed.

The web 12 having had the recessed section 73 formed at the surface 12A thus is further transported and reaches the shearing rollers 24. Here, the web 12 is transported while being supported by the lower blades 54, 56 and 58. Then, shearing force is applied when the web 12 is gripped between the upper blades 48, 50 and 52 and the lower blades 54, 56 and 58 by rotation of the upper blades 48, 50 and 52 and the flat face 72 at the web 12 and a vicinity thereof (a portion of each sloped face 74) are partially cut off. Thus, the web 12 is sheared at a predetermined position in the width direction (cutting process), and cutoff portions become a cutout scrap 79. At this time, the upper blades 48, 50 and 52 shear the web 12 at a position substantially at the center of the sloped face 74. Therefore, of the sloped face 74 formed by the pressing rollers 22, a remaining portion (a portion integrally continuing with the surface 12A of the web 12) not having been cut off by the shearing rollers 24 becomes a cutoff 91 (see FIG. 14A) of the PS plate 30.

Moreover, in the pressing process, a portion of the support member enters the escape section 70, and protrudes from the rear face 12B of the web 12; however, because all of this protruding portion is separated from the web 12 in the shearing process, no parts of the protruding portion remain to form burrs.

Additionally, as shown in FIG. 1, a conveyor belt 82 for transporting the scrap 79 and a collecting box 84 for collecting the scrap 79 transported by the conveyor belt 82 maybe installed at the machining line 90. Further, a winding device (not shown) may be provided to successively wind up the scrap 79 into a roll shape.

The web 12, sheared at a predetermined position thus, is further transported and sheared by a travelling cutter 28, providing PS plates 30 having a desired size.

As described above, in the shearing section 10 of the present embodiment, the process for forming the recessed section 73 having the sloped face 74 (cutoff portion 91 of the PS plate 30) at the web 12 and the shearing (cutting) process for cutting the web 12 at a predetermined position are carried out as separate processes using separate devices. Thus, in the cutting process, it is possible to obtain a PS plate 30 having a desired cutoff 91 without forming so-called shearing drops. In other words, in the cutting process, shearing can be done under shearing conditions that can reduce (and more preferably, eliminate) shearing drops, and consequently to reduce (and more preferably, eliminate) burrs at a rear face of the PS plate 30.

Because the desired cutoff portion 91 is formed at the PS plate 30, the surface of printing paper is free from adherence of unnecessary ink when this PS plate 30 is used for printing, and thus high quality of printed matter can be maintained. Moreover, since burrs are reduced at the rear face, the PS plate 30 does not meander and burrs do not fall off as garbage, when, for example, the PS plate 30 is transported inside an exposing device. Thus, the PS plate 30 has superior handling.

Figure 6:
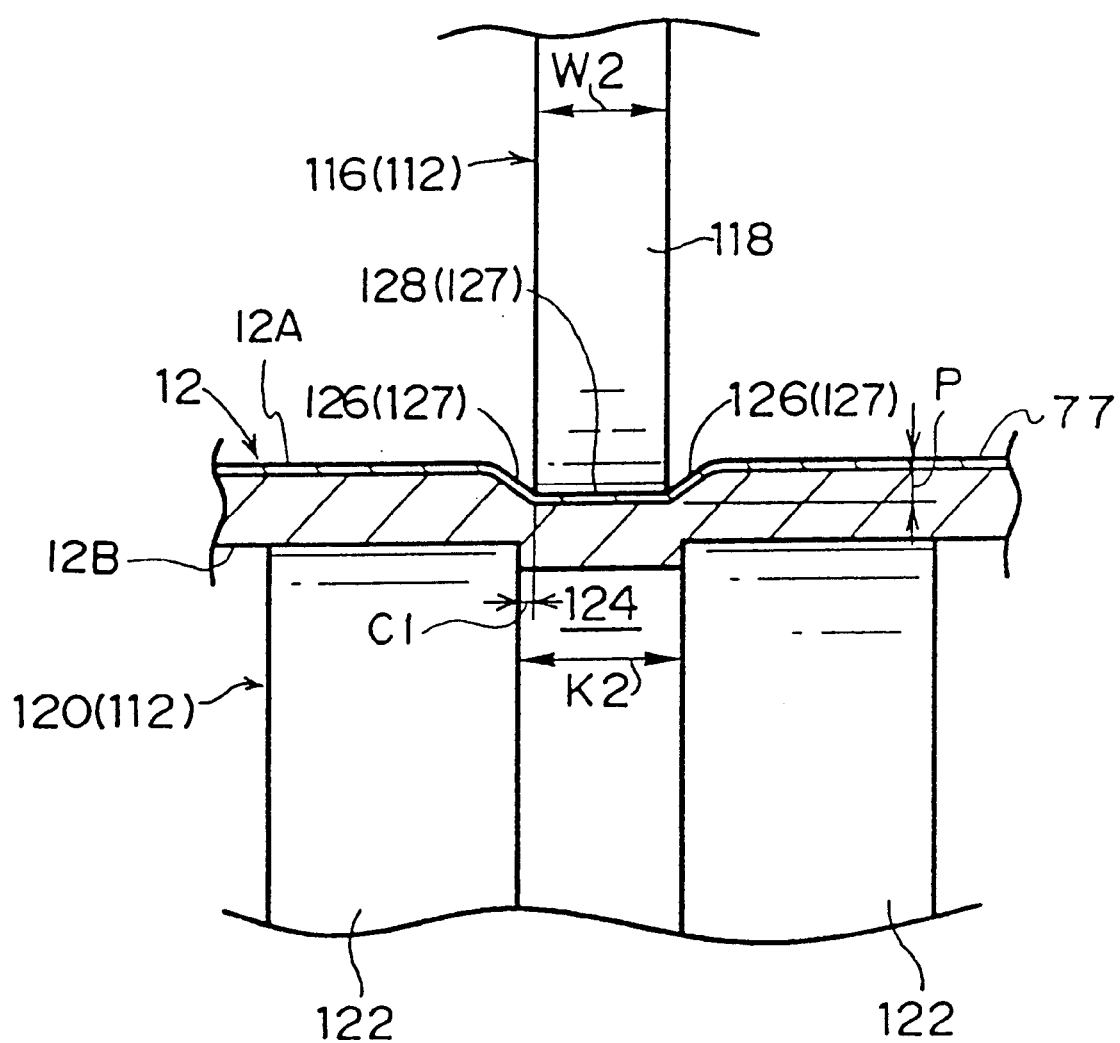
FIG. 6 is a front view that shows a pressing roller that forms a shearing section of a second embodiment of the present invention.

FIG. 6 shows a pressing roller 112 at the center in the width direction of pressing rollers related to a second embodiment of the present invention. In the second embodiment, only the structure of the pressing rollers is different from the first embodiment. Therefore, explanation will be given only of the pressing rollers, and explanation of other members will be omitted.

An upper roller 116 that forms this pressing roller 112 is only provided with a pressing section 118, which is similar to the upper roller 36 of the first embodiment, and has no portion corresponding to the sloped portion 62. Further, as in the first embodiment, a radius of the pressing section 118 is set to a fixed value such that a portion of the upper roller 116 reaches into the web 12 during transportation. Moreover, a width W2 of the upper roller 116 (that is, the width of the pressing section 118) is set to a fixed width based upon a relationship between a trimming width of the web 12, a machining force at the time of shearing and the like.

A lower roller 120 that forms the pressing roller 112 is formed by two support rollers 122 disposed apart by a K2 which is wider than the width W2 of the upper roller 116. The gap between these support rollers 122 is an escape section 124 which the support member of the deformed web 12 enters.

Also, besides the pressing roller 112 at the center in the width direction, pressing rollers are formed at end portions, with only pressing sections formed at the upper roller, and no sloped portions.

In the second embodiment having such a pressing roller, when the upper roller 116 rotates and presses the web 12 transported thereto, not only the portion directly pressed by the pressing section 118 (flat face 128), but also portions of the web 12 corresponding to both sides of the pressing section 118, are deformed, with the result that a recessed section 127 having a sloped faces 126 in the same manner as in the first embodiment is formed at the surface 12A of the web 12.

Moreover, the support member (aluminum) of the deformed web 12 is allowed to enter the escape section 124 formed by the lower roller 120. Thus, deformation movements of the support member of the web 12 are allowed and the web 12 can be reliably deformed.

In this manner, as compared with the first embodiment, the second embodiment can form the sloped faces 126 at the surface 12A of the web 12 using the simpler upper roller 116.

Here, depending on materials to be machined, the sloped faces 126 can be formed at the surface 12A of the web 12 even under the condition of K2≧W2, and a PS plate 30 having a desired shape can be obtained.

FIG. 7 shows a pressing roller 132 at the center in the width direction of pressing rollers related to a third embodiment of the present invention. In the third embodiment, as in the second embodiment, only the structure of the pressing rollers is different. Therefore, explanation will be given only of the pressing rollers, and explanation of the other members will be omitted.

In an upper roller 136 forming the pressing rollers 132, in addition to a pressing section 138 and slope portions 140 that are the same as at the upper roller 36 of the first embodiment, a disc-shaped contact portion 142 having a predetermined radius is formed from an axial direction end of each sloped portion 140. The contact portion 142 is at a predetermined position such that the lowest portion of a peripheral face of the contact portion 142 contacts without pressing the surface 12A of the transported web 12.

Moreover, a lower roller 144, that forms the pressing rollers 132 is formed by one roller whose width is substantially the same as the upper roller 136. No portions corresponding to the escape portions 70 and 124 (see FIGS. 4 and 6) are provided. Of course, escape portions may be provided therein in the same manner as in the first and second embodiments.

Also, besides the pressing roller 132 at the center in the width direction, pressing upper rollers that each have a sloped portion and a contact portion formed in succession from the pressing section inward and the lower rollers are each formed by a disc-shaped roller having a predetermined radius are pressing rollers at end portion.

In the third embodiment having such pressing rollers 132, when the upper roller 136 rotates and presses the transported web 12, recessed sections 147 having flat faces 146 and sloped faces 148 are formed at the surface 12A of the web 12, in the same manner as in the first embodiment. At this time, the contact portion 142 comes into contact with the surface 12A of the web 12. Thus, even if a lifting force is exerted at portions at both sides, of the recessed section of the web 12 because of pressing force applied at the pressing section 138, these portions are kept down by the contact portion 142, and are not raised. Hence, the sloped faces 148 can be formed with high precision.

Figure 8:
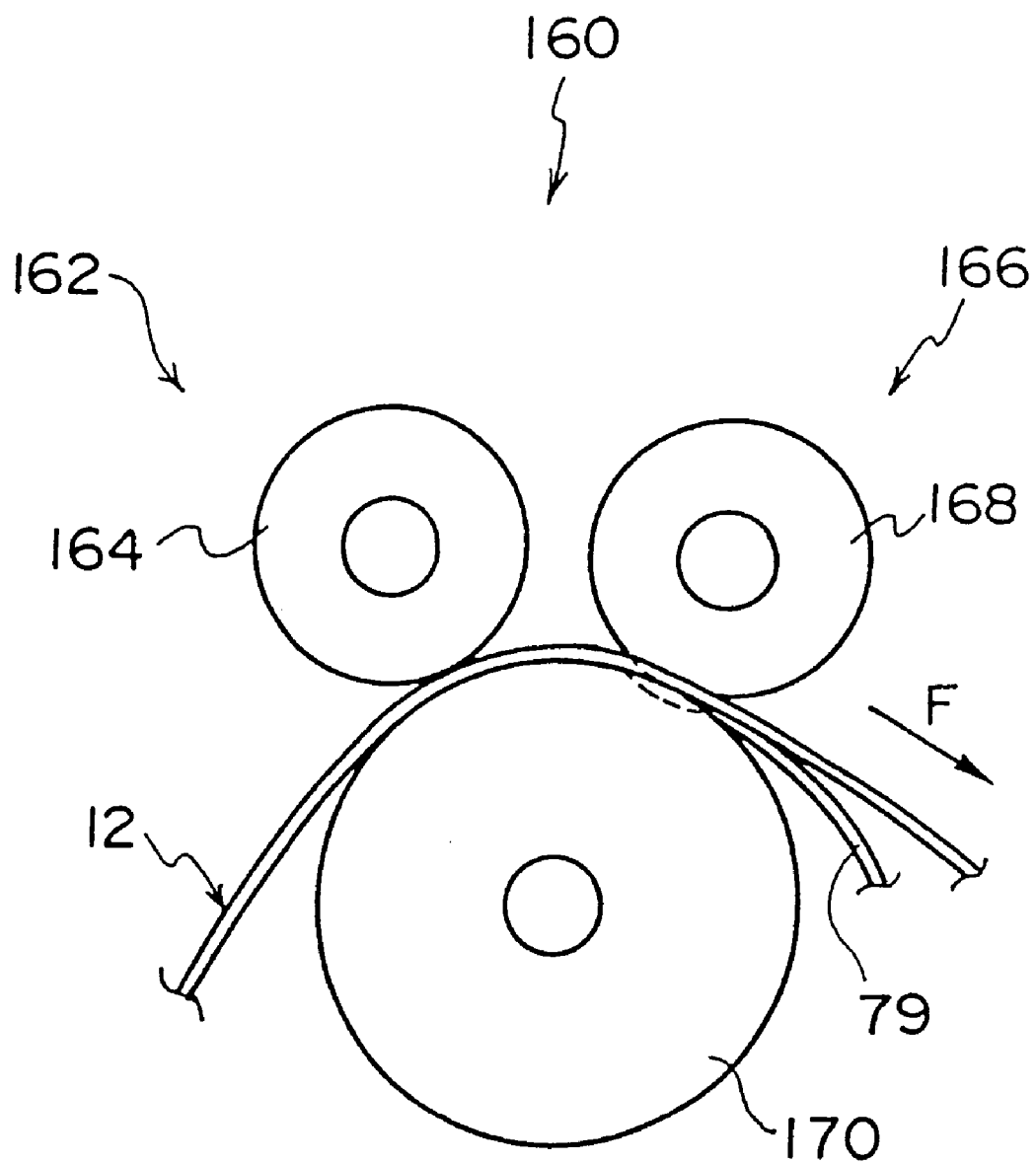
FIG. 8 is a side view that shows a shearing section of a fourth embodiment of the present invention.

FIG. 8 shows a shearing section 160 which is a planographic printing plate machining device of a fourth embodiment of the present invention.

In the fourth embodiment, an upper roller 164 that forms pressing rollers 162 has the same structure as in the first embodiment. In the same manner, an upper blade 168 that forms shearing rollers 166 also has the same structure as in the first embodiment. Further, a lower roller forming the pressing rollers 162 and a lower blade forming the shearing rollers 166 are integrally provided as a pressing and shearing roller 170, in which respect this embodiment is different from the first embodiment. Thus, as can be seen from FIG. 8, the web 12 is gripped between the upper roller 164 and the pressing and shearing roller 170 while being supported by the pressing and shearing roller 170. Thus, in the same manner as the first embodiment, a recessed section 73 (see FIG. 4) having a sloped face 74 is formed. The web 12 is transported while being curved in a state of planar contact with the pressing and shearing roller 170, gripped between the upper blade 168 and pressing and shearing roller 170, and cut at the position df the recessed section 73.

In this manner, at the shearing section 160 of the fourth embodiment, the pressing and shearing roller 170 is provided such that the lower rollers of the pressing roller 162 and the lower blade of the shearing rollers 166 are formed by a common member. Thus, precision of pressing positions of the pressing rollers 162 and shearing positions of the shearing rollers 166 can be improved (positional offsets are reduced).

Moreover, because each lower roller of the pressing rollers 162 and each lower blade of the shearing rollers 166 have been made a common member, the number of parts is reduced as compared with cases in which these members are formed as separate members, and a structure for rotating these members can be simplified.

Moreover, in the fourth embodiment, the web 12 is made to planarly-contact the pressing and shearing roller 170 and the contact area is wider compared with the first to third embodiments. Thus, because frictional force between the web 12 and the pressing and shearing roller 170 is increased compared with cases of point contact, it is possible to prevent meandering and oscillation of the web 12 during transport, and consequently to transport the web 12 stably.

Also, in the shearing section 160 of the fourth embodiment, the upper roller 164 that forms the pressing rollers 162 does not necessarily have the same structure as in the first embodiment and, for example, it may have the same structure as in the second embodiment (a shape having no slope section 62) or the same structure as in the third embodiment (a shape having a contact portion 142 (see FIG. 7)).

Figure 9:
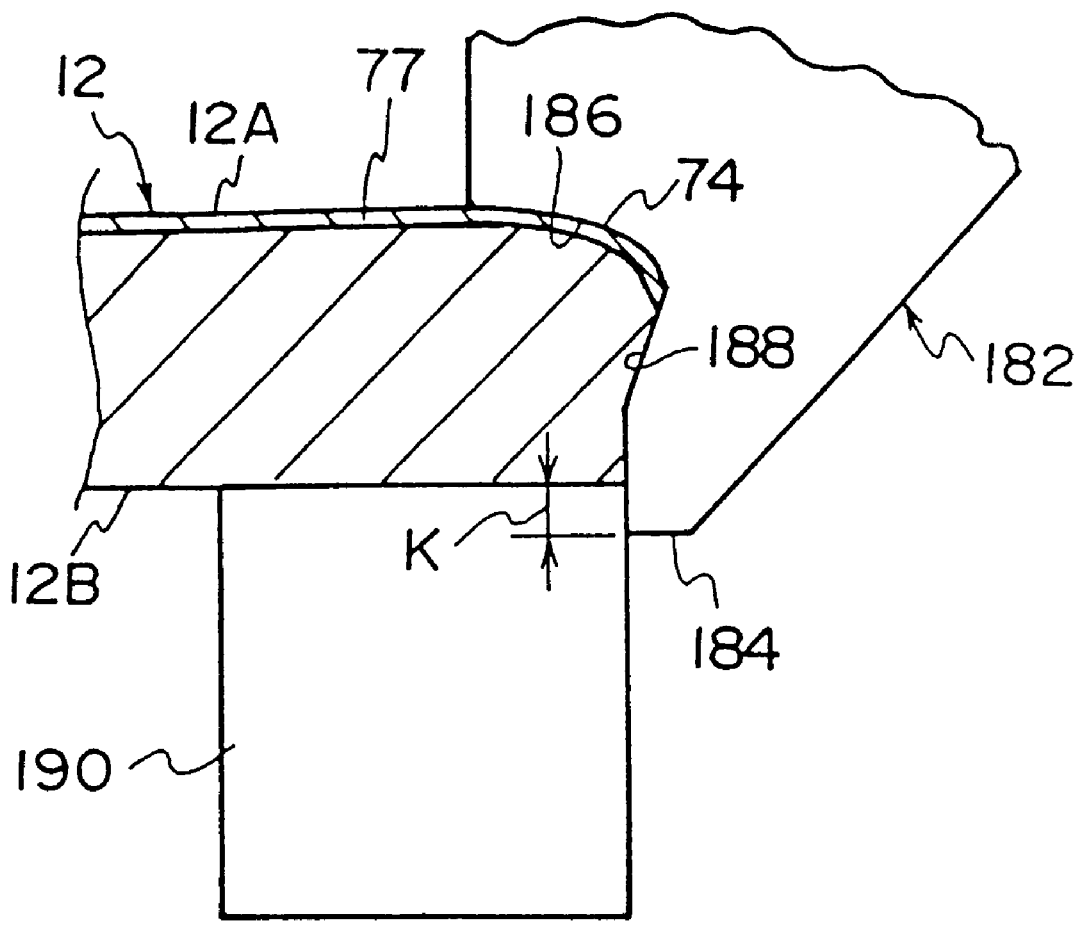
FIG. 9 is a front view that shows a shearing section of a fifth embodiment of the present invention.

FIG. 9 shows an enlarged shearing and pressing blade 182 of a shearing section that forms a planographic printing plate machining device of a fifth embodiment of the present invention.

This shearing and pressing blade 182 is formed as a whole into a truncated cone shape with a peripheral edge thereof being a shearing blade portion 184. Moreover, a slope section 186 whose radius is gradually reduced inward (to the left in FIG. 9) is formed at an inner side from the shearing blade portion 184 in the radial direction (an upper side in FIG. 9). Further, an escape recess 188 is formed continuing from the slope section 186 as a partially thinner portion extending toward the outside of the shearing and pressing blade 182.

Furthermore, in correspondence with the shearing and pressing blade 182, a lower roller 190 having a predetermined spacing from the shearing blade portion 184 is provided.

In the shearing section of the fifth embodiment having the above-described structure, the shearing and pressing blade 182 continuously performs shearing of the web 12 and formation of the sloped face 74. In other words, first, rotation of the shearing and pressing blade 182 allows the shearing blade portion 184 to cut the web 12 at a predetermined position, and then the slope section 186 presses the web 12 from the surface side to form the sloped face 74. At this time, deformation movement of the pressed web 12 is permitted, by aluminum forming the web 12 being allowed to enter the escape recess 188. Thus, the sloped face 74 can be formed even by a small pressing force.

As described above, in the shearing section of the fifth embodiment, one shearing and pressing blade 182 and one lower roller 190 carry out the cutting of the web 12 and formation of the slope section 186. Therefore, precision between a shearing position of the shearing blade portion 184 and a pressing position of the slope section 186 can be improved (positional offsets are reduced). Moreover, compared with the first to fourth embodiments, the number of parts is further reduced.

Additionally, in examples of the above-mentioned first to fourth embodiments, the slope section 62 (cutoff portion 91) is formed with a straight shape in cross section. However, with respect to shape of the cutoff portion 91, the shapes of the cutoff portion 91 that can be formed by the planographic printing plate machining device of the present invention are, of course, not intended to be limited to this shape. That is, any shape may be used as long as unnecessary ink does not adhere thereto at the time of printing. For example, as described in the fifth embodiment (see FIG. 9), the end face of the cutoff portion 91 may be shaped into a curved line in cross section, or may be formed into a shape without a bent portion (a border portion between a slope section and a flat section). Moreover, the angle made by the cutoff portion 91 and the surface 30A of the planographic printing PS plate 30 is not particularly limited. Such a modification in the shape of the cutoff portion 91 may be easily made by, for example, changing the shape of the slope sections 62 and 140 of the pressing rollers 22 and 136 in the shearing sections in the first embodiment and the third embodiment. Further, in the shearing section of the second embodiment, a cutoff portion 91 having a desired shape can be formed by setting pressing conditions with consideration of hardness and the like of the web 12. Moreover, a plurality of sloped faces that are inclined with respectively different inclinations may be formed around the PS plate 30 so as to form a recessed section including these sloped faces. In this case, border portions of the sloped faces may form convex shapes or concave shapes toward the surface 30A of the PS plate 30. Furthermore, in a case wherein a PS plate 30 having such sloped faces is manufactured, for example, a plurality of pressing rollers may be used in correspondence with the plurality of sloped faces, or one kind of pressing roller, forming a plurality of sloped faces, may be used.

Figure 11A:
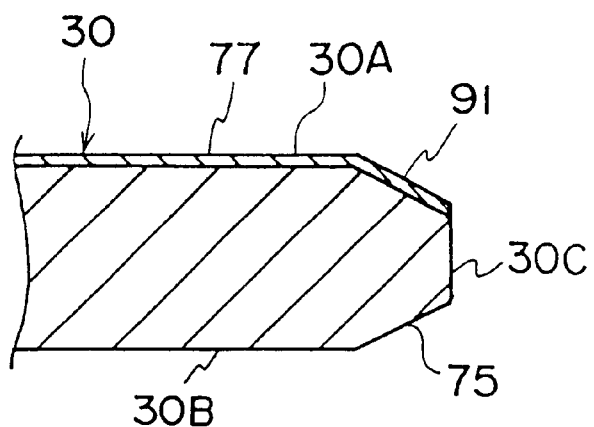
FIG. 11A is a cross-sectional view that shows another example of a cutting shape of planographic printing plate obtained by the present invention.
Figure 11B:
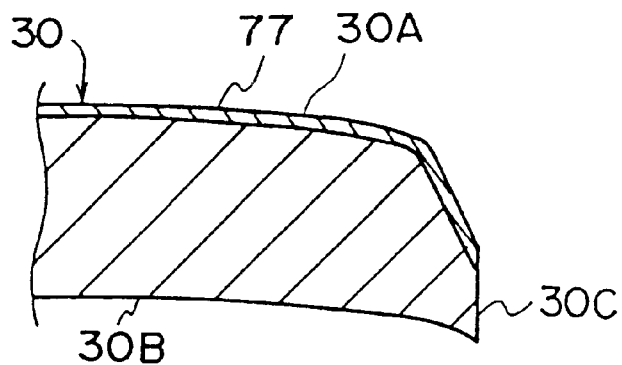
FIG. 11B is a cross-sectional view that shows another example of a cutting shape of planographic printing plate obtained by the present invention.

In addition, by changing shapes, pressing conditions and shearing conditions of the members that form the pressing rollers and the shearing rollers as shown in FIG. 11A, a sloped face 75 may be formed at a cut edge of a rear face of a PS plate 30 or, as shown in FIG. 11B, the entire PS plate 30 may be curved (including the rear surface). By forming the PS plate 30 into such shapes, it becomes possible to further prevent generation of edge stains. With respect to burrs on the PS plate 30, burrs are allowable within such a range that they do not affect staining of printing paper and handling (transportability and the like).

Figure 11C:
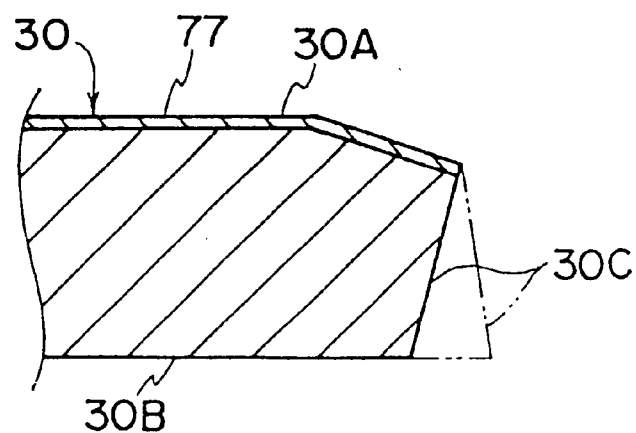
FIG. 11C is a cross-sectional view that shows another example of a cutting shape of a planographic printing plate obtained by the present invention.

Moreover, in the PS plate 30 of the present invention, an angle of a cut surface 30C with the surface 30A of the PS plate 30 is not limited to 90°. An acute angle as indicated by a solid line in FIG. 11C or, in contrast, an obtuse angle as indicated by a dot-dot-dash line, may be made.

Figure 12C:
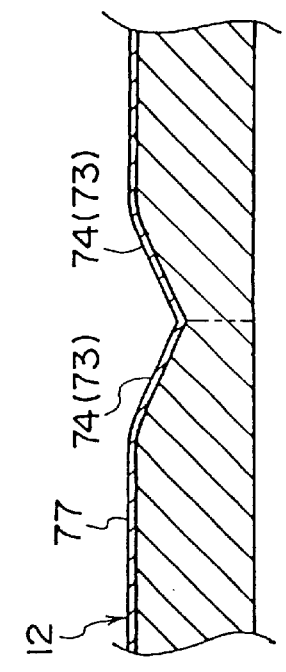
FIGS. 12A–12D show a case in which the shearing section of the present invention cuts a web at only one position with respect to one recessed section thereof.
Figure 12D:
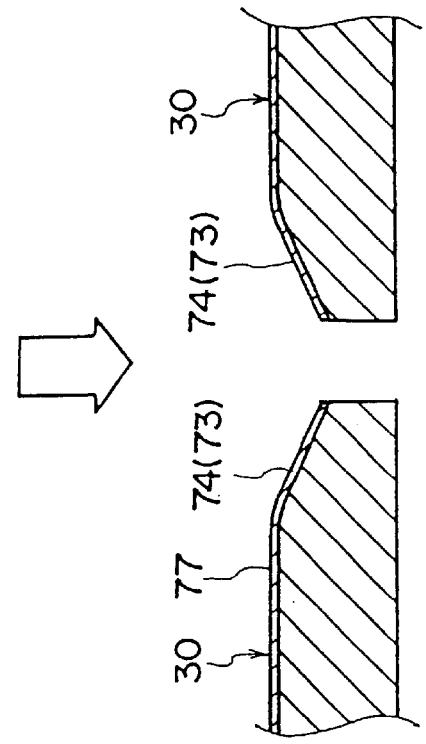
Figure 12A:
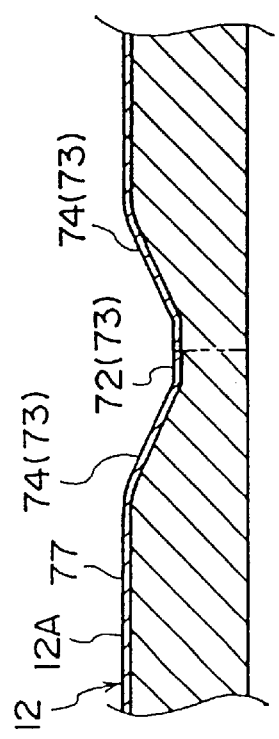
Figure 12B:
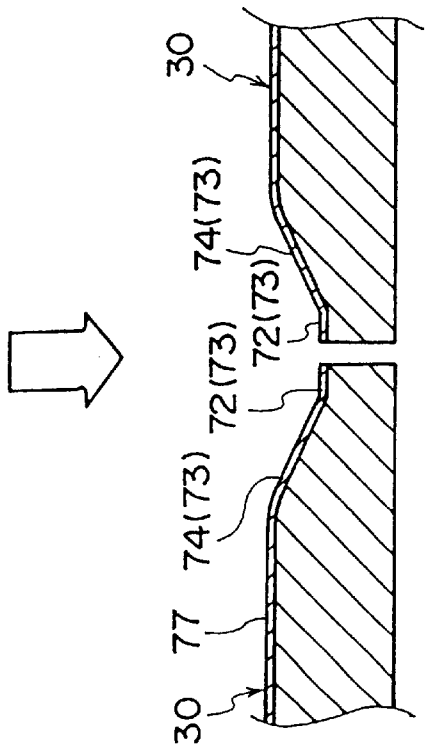

In the above-described cutting process, the flat face 72 formed at the web 12 and neighboring portions are cut off (cutting at two places). However, cutting may be carried out at only one place to divide the web 12 without cutting off. For example, as shown in FIG. 12A, by carrying out cutting so as to divide the web 12 at a position corresponding to the flat face 72, a PS plate 30 having across-sectional shape, indicated by FIG. 12B (where the flat face 72 remains), may be formed. In this case, it is preferable to cut the web 12 substantially at the center in the width direction of the flat face 72. However, cutting is not limited thus and it is possible to select a desired cutting position within the range of the flat face 72. Moreover, as shown in FIG. 12C, when the shape of the recessed section 73 is preliminarily formed into a shape formed only by sloped faces 74 (without having a flat face), the recessed section 73 may be sheared at a bottom portion (a position having the thinnest thickness of the web 12) to form a PS plate 30 shown in FIG. 12D. In any of these shearing methods, because the web 12 is not cut off, cutout scraps 79 are not generated and yield is improved.

Furthermore, in cases wherein the process for forming the sloped face 62 (cutoff portion 91) at the web 12 and the process for shearing (cutting) the web 12 to a desired shape are provided as separate processes, the order of these processes is not particularly limited. For example, the web 12 may be first sheared (cut), and then the sloped face 62 (cutoff portion 91) may be formed at the web 12. The aforementioned fifth embodiment exemplifies such a case in which the web 12 is cut first.

Applicable examples of the planographic printing plate machining device of the present invention include not only the shearing sections as described in the respective embodiments above, but any device for shearing planographic printing plates. For example, the planographic printing plate machining device of the present invention may be applied as the travelling cutter 28 (see FIG. 1) for cutting the web 12 in the width direction. This case can be exemplified by a structure in which pressing blades (pressing upper blades and pressing lower blades) having the same cross-sectional shape as the pressing rollers described in any one of the above-described embodiments are provided to pass across the entire width of the web 12 and, at a downstream side thereof, cutting blades (cutting upper blades and cutting lower blades) having the same cross-sectional shape as shearing blades described in any one of the above-described embodiments are provided to pass across the entire width of the web 12 in the same manner. In such a structure, a method can be found in which, for example, the pressing upper blades are moved up and down so as to form recessed sections having sloped faces at the web 12, and in a next process, the cutting upper blades are moved up and down so that the web 12 is sheared in the width direction at the sloped faces.

Figure 13:
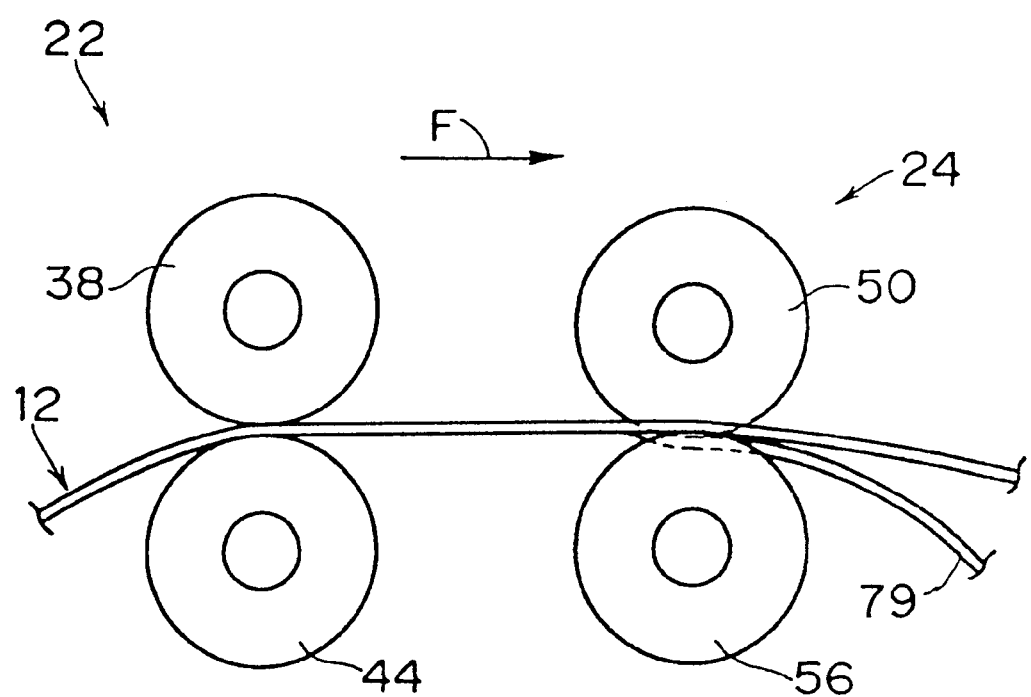
FIG. 13 is a side view that shows another example of the shearing section of the present invention.

Further, at the shearing sections of the first to third embodiments, for example, the web 12 is usually transported in a flat plane. However, in these embodiments, the web 12 may be transported in a curved manner along the transporting direction, in the same manner as in the fourth embodiment. In particular, for example, as shown in FIG. 13, when the web 12 is curved downward at an upstream side of the pressing rollers 22 and at a downstream side of the shearing rollers 24, the web 12 has an increased contact area with the lower rollers 42, 44 and 46 and the lower blades 54, 56 and 58 (see FIG. 3). Thus, frictional force between the web 12 and the lower rollers 42, 44 and 46 and the lower blades 54, 56 and 58 increases, meandering and oscillation of the web 12 during transport can be prevented, and the web 12 can be transported more stably. Similarly, in the fifth embodiment, the web 12 may be curved in the same manner as in the fourth embodiment to make planar with the lower roller 190.

Moreover, holding members, such as a belt that supports the web 12 while being moved at the same travelling speed as the transporting speed of the web 12, fingers, ring spacers, etc. may be provided at the machining line 90 to transport the web 12 more stably.

Furthermore, the planographic printing plate machining device and planographic printing plate machining method of the present invention may be applied not only at the above-described machining line in which a web that has been coated with a photosensitive layer, and wound up into a coil is successively fed and processed, but also to machining lines incorporating various processes, such as a line in which a web is coated with a photosensitive layer and continuously machined without being wound up, a line in which a web is wound up into a coil after having been machined, a line in which, after having been cut into master sheets, a web is further cut into sheets so as to have dimensions of a final product to be shipped, and the like. Transportation of the web 12 is not limited to a machining line that transports the web 12 with the photosensitive layer 77 facing up. A machining line may transport the web 12 with the photosensitive layer 77 facing down, a machining line may transport the web 12 in a vertical position with its width direction oriented vertically, and the like. That is, a transportation state of the web 12 is not particularly limited.

Additionally, the planographic printing plate machining device and planographic printing plate machining method of the present invention may also be applied to an aluminum coil prior to surface treatment. Moreover, the PS plate 30 of the present application may be subjected to an insensitivity treatment before or after a plate forming process.

The PS plates 30 of the present invention may be PS plates used in general printing (such as commercial printing and newspaper printing), for example, as described in Japanese Patent Application Laid-Open (JP-A) No. 10-100556, and besides those PS plates, maybe PS plates used as so-called waste plates; for example, as proposed by the applicant of the present application in Japanese Patent Application No. 10-42014. In a case when the PS plate is used as a waste plate, the photosensitive layer 77 is not necessary, or omitted by preference. Therefore, the PS plates 30 of the present invention include PS plates not coated with a photosensitive layer 77. Moreover, photosensitive layers 77 may be applied to both of surfaces of an aluminum support member. In the case of a PS plate 30 having a support member coated with photosensitive layers 77 on both of the surfaces, a cross-sectional shape, for example, as shown in FIG. 11A makes it possible to eliminate edge stains, even when either of the surfaces is used for printing. Moreover, the PS plate 30 of the present invention also includes PS plates used in digital printing such as photopolymer, thermal and other processes.

EXAMPLES

The following description will further explain the present invention in detail by means of examples. However, the present invention is, of course, not intended to be limited by these examples.

FIG. 14B shows specific values of shearing sections, cross-sectional shapes and degrees of staining (stains due to unnecessary ink transferred onto the surface of printing paper) when the webs 12 are sheared using the shearing sections of the first to fifth embodiments of the present invention and conventional shearing section (slitter). A conventional shearing section is a shearing section that is structured so as to form a cutoff portion 91 at the PS plate 30 by producing a shearing drop simultaneously with the shearing process, without carrying out the pressing process and the shearing process at the web 12 separately as in the present invention. Moreover, examples 1 to 5 in the Table correspond respectively to the first to fifth embodiments of the present invention.

Amount of push P in this Table refers to the distance between the lowest portion of the upper roller (a portion pushed into the web 12) and the surface 12A of the web 12 in the recessed section forming process, as shown in FIGS. 4, 6 and 7. Further, clearance C1 in the recessed section forming process refers to a distance in the width direction between the end face of the pressing section of the upper roller and the end face of the escape section formed by the lower rollers and, as shown in FIG. 6, in a cases where there is a gap, the clearance is defined as positive. In the case of the third embodiment of the present invention (example 3) which has no escape section (see FIG. 7), no clearance is set. Moreover, in the fifth embodiment of the present invention (example 5), only one shearing and pressing blade 182 is used to shear the web 12 (the shearing process) and form the recessed section 73 (the recessed section forming process). Therefore, because the respective values in the recessed section forming process are the same as respective values in the shearing process, the values for the recessed section forming process are omitted. Further, in the case of the conventional shearing section (slitter), because there is no pressing process, no numeric values are listed for a pressing process.

"Mesh" in this Table refers to a distance between the lowest portion of the upper blade and the rear face 12B of the web 12 in the shearing process, as shown in FIGS. 5 and 9. Moreover, clearance in the shearing process refers to a distance in the width direction between the end face of the upper blade and the end face of the lower blade. In the fourth embodiment of the present invention (example 4), since the lower roller and the lower blade are integrally provided as the shearing press roller 170, the diameter of the lower blade in the shearing process is the same as the diameter of the lower roller in the recessed section forming process.

As shown in FIG. 14A, X and Y in the Table respectively refer to width and depth of the cutoff portion 91 of the sheared PS plate 30, and B refers to an amount of protrusion of burrs from the rear face 12B of the PS plate 30. Moreover, the respective "slitter conditions" in the Table refer to cases in which shearing is carried out with respective conditions at the shearing section appropriately set such that the width X and the depth Y of the cutoff portion 91 have the values shown in the Table.

Also, in the Table, symbols "○", "Δ", "○Δ", and "X" respectively represent the following states:

○: No edge stains occur.

Δ: Edge stains faintly or partially occur.

○Δ: The length and visibility of edge stains is in an intermediate state between the above-mentioned ○ and Δ.

X: Edge stains clearly appear as lines around the entire periphery of printing paper.

As material to be evaluated in the present examples, PS plates were prepared and used as follows. An aluminum material (JIS-A1050), which contains 99.5% by weight of aluminum, 0.01% by weight of copper, 0.03% by weight of titanium, 0.3% by weight of iron and 0.1% by weight of silicon, was formed into a rolled plate of 0.30 mm thickness, subjected to graining at the surface using an aqueous suspension containing 20% by weight of Pumicetone (made by Kyoritsu Yogyo K. K.) of 400 mesh and rotary nylon brushes (6, 10-nylon), and thoroughly washed with water.

The material was immersed in an aqueous solution containing 15% by weight of sodium hydroxide (containing 4.5% by weight of aluminum) to be etched such that a dissolved amount of aluminum was 5 g/m$^2$, and then washed with flowing water. Further, the plate was neutralized by 1% by weight nitric acid, and then subjected to an electrolytic surface-roughening treatment using a voltage having a rectangular alternating waveform (current ratio r=0.90, a current waveform described in an embodiment of Japanese Patent Application Publication (JP-B) No. 58-5796) having an anode voltage of 10.5 V and a cathode voltage of 9.3 V, with an anode charge of 160 Coulomb/d m$^2$, in an aqueous solution containing 0.7% by weight of nitric acid (containing 0.5% by weight of aluminum). After having been washed, the material was immersed in an aqueous solution containing 10% by weight of sodium hydroxide at 35° C. to be etched such that a dissolved amount of aluminum was 1 g/m$^2$, and then washed. Next, this was subjected to treatment by being immersed in an aqueous solution containing 30% by weight of sulfuric acid at 50° C., and then washed.

Further, the material was subjected to a porous anode oxidation coating film forming process using a DC current in an aqueous solution containing 20% by weight of sulfuric acid (containing 0.8% by weight of aluminum) at 35° C. Specifically, an electrolysis process was carried out at a current density of 13 A/dm$^2$, and an anode oxidation coating film of 2.7 g/m$^2$ was obtained by adjusting the duration of electrolysis. In order to form a negative-type photosensitive planographic printing plate by using a diazo resin and a binder, this support member was washed with water, immersed in an aqueous solution containing 3% by weight of sodium silicate at 70° C. for 30 seconds, and then washed and dried.

The aluminum support member obtained as described above had a reflection density of 0.30 as measured by a Macbeth RD920 reflection densitometer, and a center line average roughness Ra of 0.58 μm, as standardized by JIS B00601. Next, the support member was coated with an aqueous solution containing 1.0% by weight of a copolymer of methylmethacrylate/ethylacrylate/2-acrylamide-2-methylpropane sodium sulfonate (an average molecular weight of approximately 60,000)(mole ratio 50/30/20) by a roll coater such that the amount of coating after drying, was at 0.05 g/m².

Further, the following photosensitive liquid-1 was applied using a bar coater, and dried at 110° C. for 45 seconds. The amount of coating was 2.0 g/m² dry weight.

Photosensitive Liquid-1

| | |
|---|---|
| diazo resin-1 | 0.50 g |
| binder-1 | 5.00 g |
| STILITE HS-2 (made by Daido Kogyo (K.K.)) | 0.10 g |
| Victoria Pure Blue BOH | 0.15 g |
| tricresyl phosphate | 0.50 g |
| dipicolinic acid | 0.20 g |
| FC-430 (a surfactant made by 3M) | 0.05 g |

Solvent

| | |
|---|---|
| 1-methoxy-2-propanol | 25.00 g |
| methyl lactate | 12.00 g |
| methanol | 30.00 g |
| methylethylketone | 30.00 g |
| water | 3.00 g |

The above-mentioned diazo resin-1 was obtained as follows: First, 29.4 g of 4-diazodiphenylamine sulfate (purity 99.5%) was gradually added to 70 ml of 96% sulfuric acid at 25° C., and stirred for 20 minutes. To the resulting mixture 3.26 g of para-formaldehyde (purity 92%) was gradually added over approximately 10 minutes, and mixture was stirred at 30° C. for four hours to cause a condensation reaction to proceed. Here, the condensation mole ratio of the above-mentioned diazo compound and formaldehyde was 1:1. The resulting reaction product was poured into 2 liters of water with ice while being stirred, and then subjected to treatment with a chilled strong aqueous solution in which 130 g of sodium chloride has been dissolved. The resulting precipitate was collected by suction filtering, and partially dried solid matter was dissolved in 1 liter of water, filtered, cooled with ice, and treated with an aqueous solution in which 23 g of potassium hexafluorophosphate had been dissolved. Lastly, the resulting precipitate was filtered, collected, and air-dried. Thus, diazo resin-1 was obtained.

Binder-1 was a non-water soluble, alkaline-water soluble coating forming high polymer compound which was a copolymer of 2-hydroxyethylmethacrylate/acrylonitrile/methylmethacrylate/methacrylic acid (weight ratio: 50/20/26/4, average molecular weight: 75,000, acid content: 0.4 meq/g).

STILITE HS-2 (made by Daido Kogyo (K. K.)), which is a high polymer compound having a higher fat sensitivity than the binder, is a 50/50 (mole ratio) copolymer of styrene/maleic acid mono-4-methyl-2-pentylester, and has an average molecular weight of approximately 100,000. A mat layer-forming resin liquid was sprayed as described below onto the surface of a photosensitive layer formed as described above in the following method so as to form a mat layer.

An aqueous solution of 12% of a copolymer of methylmethacrylate/ethylacrylate/2-acrylamide-2-methylpropanesulfonate (charged weight ratio 65:20:15), a portion of which was converted to sodium salt, was prepared as the mat layer-forming resin liquid. Vapor of this resin liquid was sprayed by a rotary atomizing electrostatic coating device at the photosensitive layer for 2.5 seconds of liquid application, to moisten the coating face. An atomizing head rotated at 25,000 rpm, supply of the resin liquid 4.0 ml/min., an applied voltage at the atomizing head—90 kV, ambient temperature was 25° C. at the time of coating and relative humidity was 50%. Then, three seconds after moistening, the coating was subjected to a hot air flow with a humidity of 10% at 60° C. for five seconds so as to be dried. The mat had an average height of approximately 6 μm, an average size of approximately 30 μm and a coating amount of 150 mg/m².

A coiled web having a plate thickness of 0.3 mm and a width of 820 mm, thus obtained, was machined on a machining line under various conditions to be changed to a width of 400 mm, and sheets of PS plates having a cut length of 1100 mm were obtained.

In order to carry out evaluation of printing, the sheets thus formed were subjected to image exposure, and were developed with a liquid formed by diluting DN-3C (an alkaline aqueous solution developer made by Fuji Photo Film Co., Ltd.) with water at 1:1, using an 800 H (an automatic developing device made by Fuji Photo Film Co., Ltd.). GN (a gum made by Fuji Photo Film Co., Ltd.) was used as a finisher, after dilution with water to 1:1 and was applied to the sheet immediately after developing, and then dried. Thus, plate formation was completed. 20,000 printing plates were printed at a speed of 100,000 plates/hour using an offset rotary printing machine with magenta ink, which is susceptible to crack stains. Thus, stains at the end portions were evaluated.

As can be seen from this Table, in conventional shearing sections; for example, in a case when the cutting was done under such conditions as to prevent burrs (slitter condition 1), because the width X and depth Y of the cutoff portion 91 were inevitably reduced, edge stains occurred. Moreover, in a case when the cutting was done under such conditions as to increase the width X and depth Y of the cutoff portion 91 (slitter condition 2), although edge stains were alleviated as compared with slitter condition 1, the amount of protrusion B of burrs 78 became greater. In a case when the depth of the notch 91 was made greater (slitter condition 3), cracks occurred at the surface 12A (the surface treatment layer) of the PS plate 30, resulting in edge stains. Moreover, the amount of protrusion B of burrs became even greater.

In contrast, in the case of the first embodiment of the present invention, because sufficient sizes of the width X and the depth Y of the cutoff portion 91 were provided, edge stains were reduced to a degree at which no problem would arise in practical use, and there were no burrs at all at the rear face 12B. Moreover, in the cases of the second and third embodiments, because even larger sizes of the width X and depth Y of the cutoff portion 91 were provided, edge stains were completely eliminated, and the amount of protrusion of burrs B at the rear face 12B was reduced to a degree at which no problem would arise in practical use. Furthermore, in the case of the fourth embodiment, similar sizes to the first embodiment of the width X and depth Y of the cutoff portion 91 were obtained, and no edge stains occurred. In the fifth embodiment, edge stains were reduced to a degree at which no problem would arise in practical use, and the amount of protrusion of burrs as compared with the conventional shearing section (slitter) was reduced.

What is claimed is:

1. A device for machining a planographic printing plate having a printing side surface, the device comprising:
  (a) a pressing member which presses and indents a planographic printing plate from the printing side surface, thereby forming a recessed section that has a sloped face which continues from the printing side surface; and (b) a cutting member for cutting the planographic printing plate.

2. The device of claim 1, wherein the pressing member includes:
   (a) a pressing portion extending in a direction substantially parallel with the printing side surface of a planographic printing plate, for pressing the planographic printing plate from the printing side surface; and
   (b) a sloped portion that is slanted with respect to the printing side surface of the planographic printing plate so as to form the sloped face when the pressing portion presses the planographic printing plate.

3. The device of claim 2, wherein the pressing portion includes a contact section that contacts the printing surface side of the planographic printing plate, when the pressing portion presses the planographic printing plate and the sloped portion forms the sloped face.

4. The device of claim 2, further comprising an expansion permission section, which permits expansion of the planographic printing plate caused by pressing.

5. The device of claim 1, further including a supporting member which supports the planographic printing plate, the recessed section being formed by sandwiching the planographic printing plate between the supporting member and the pressing member, and the cutting member including a cutting blade which cuts the planographic printing plate between the cutting blade and said supporting member.

6. The device of claim 1, further comprising a shearing press blade formed to integrally include:
   (a) a cutting blade section that is capable of cutting the planographic printing plate, thereby forming a cut edge portion; and
   (b) a recessed section forming section which presses the cut edge portion so as to form a recessed section in the planographic printing plate.

7. The device of claim 6, further comprising an expansion permission section, which permits expansion of the planographic printing plate caused by pressing.

8. The device of claim 1, further comprising an expansion permission section, which permits expansion of the planographic printing plate caused by pressing.

9. The device of claim 8, wherein the planographic printing plate includes a base side, the device further comprising a support member which, when the planographic printing plate is pressed by the pressing member, supports the planographic printing plate from the base side, the support member being formed by two support rollers disposed with a gap separating the rollers from one another, the gap having a width greater than a width of the pressing member, with the pressing member being disposed opposing the gap.

10. The device of claim 9, wherein the gap serves as the expansion permission section.

11. The device of claim 1 wherein the cutting member cuts the planographic printing plate along an area within the recessed section of the planographic printing plate.

12. A device for machining a planographic printing plate having a printing side surface and a base side, the device comprising:
   (a) a pressing part which presses and indents a planographic printing plate from the printing side surface, thereby forming a recessed section that has a sloped face which continues from the printing side surface; and
   (b) a support member which supports the planographic printing plate from the base side, when the planographic printing plate is pressed by the pressing part; and
   (c) a cutting member for cutting the planographic printing plate at the recessed section, wherein the pressing part is disposed facing the support member with the planographic printing plate located therebetween when being pressed.

13. The device of claim 12, wherein the pressing member includes:
   (a) a pressing portion extending in a direction substantially parallel with the printing side surface of the planographic printing plate, for pressing the planographic printing plate from the printing side surface; and
   (b) a sloped portion that is slanted with respect to the printing side surface of the planographic printing plate so as to form the sloped face when the pressing portion presses the planographic printing plate.

14. The device of claim 13, wherein the pressing portion includes a contact section that contacts the printing surface of the planographic printing plate when the pressing portion presses the planographic printing plate and the sloped portion forms the sloped face.

15. The device of claim 12, wherein when the cutting member cuts the planographic printing plate at the recessed section, the support member supports the planographic printing plate from the base side at a position facing the cutting member.

16. The device of claim 12, further comprising an expansion permission section, which permits expansion of the planographic printing plate when it is pressed.

17. The device of claim 16, wherein the support member is offset with respect to the pressing portion, relative to a direction of pressing, when the planographic printing plate is disposed between the pressing portion and the support member and is being pressed.

18. The device of claim 16, wherein the support member is formed by two support rollers disposed with a gap separating the rollers from one another, with the pressing portion disposed opposing the gap.

* * * * *